(12) United States Patent
Ariyoshi

(10) Patent No.: US 6,172,846 B1
(45) Date of Patent: Jan. 9, 2001

(54) DISK DRIVE

(75) Inventor: Yuji Ariyoshi, Toyonaka (JP)

(73) Assignee: Matsushita Electric Industrial Co., Ltd., Kadoma (JP)

( * ) Notice: Under 35 U.S.C. 154(b), the term of this patent shall be extended for 0 days.

(21) Appl. No.: 09/160,238

(22) Filed: Sep. 25, 1998

(30) Foreign Application Priority Data

Oct. 3, 1997 (JP) .................................................. 9-271124

(51) Int. Cl.$^7$ ................................................. G11B 17/04
(52) U.S. Cl. ................................ 360/99.06; 369/77.02; 360/99.02
(58) Field of Search ........................... 360/99.06, 99.07, 360/99.02, 99.03; 369/75.2, 77.2

(56) References Cited

U.S. PATENT DOCUMENTS

| | | | |
|---|---|---|---|
| 4,777,631 | * 10/1988 | Kamoshita et al. | 369/77.2 |
| 5,063,554 | * 11/1991 | Uehara | 369/77.2 |
| 5,088,085 | * 2/1992 | Uehara | 369/77.2 |
| 5,696,746 | * 12/1997 | Ookawa et al. | 369/77.2 |

FOREIGN PATENT DOCUMENTS

| | | |
|---|---|---|
| 27 39 127 | * 10/1978 | (DE) . |
| 63-148455 | * 6/1988 | (JP) . |
| 63-249957 | * 10/1988 | (JP) . |
| 3-216853 | * 9/1991 | (JP) . |
| 4-067345 | * 3/1992 | (JP) . |
| 6-267124 | 9/1994 | (JP) . |
| 8-102118 | 4/1996 | (JP) . |
| 8-171765 | 7/1996 | (JP) . |
| 8-180625 | 7/1996 | (JP) . |

* cited by examiner

Primary Examiner—William Klimowicz
(74) Attorney, Agent, or Firm—Wenderoth, Lind & Ponack, L.L.P.

(57) ABSTRACT

A disk drive capable of preventing an incorrectly inserted cartridge from further advancing in the earliest possible stage of insertion and securing the longest possible stroke of automatic transfer of the cartridge. A slider is provided for transferring a disk cartridge that is being inserted between the mounting and dismounting position and a fully inserted position while moving together with the disk cartridge with respect to a holder for guiding and holding the cartridge. The slider is provided with a projection that faces a specified side portion of the disk cartridge extending in the direction in which the cartridge is inserted and allows the insertion of the cartridge while being slidably fitted in a groove provided on the side portion of the disk cartridge extending in the direction in which the cartridge is inserted when the disk cartridge is being inserted in the correct position. The projection prevents the disk cartridge from being advanced further when the cartridge is being inserted in an incorrect direction with the same or correct width of insertion.

6 Claims, 20 Drawing Sheets

DISK DRIVE

BACKGROUND OF THE INVENTION

The present invention relates to disk drives, and more particularly, to a disk drive which is applied to a disk of, for example, the so-called MD (minidisk) or the like including a recording and/or reproducing medium encased in a disk cartridge and is provided for recording information on the medium or reproducing the information recorded on the medium.

As a disk drive to be applied to a disk of, for example, the so-called MD (minidisk) or the like including a recording and/or reproducing medium encased in a disk cartridge, there has conventionally been generally known a disk drive provided with a recording and reproducing unit for recording information on the recording and/or reproducing medium encased in a disk cartridge or reproducing the information recorded on the medium, a holder for guiding and holding the disk cartridge that is being inserted, a transfer member capable of transferring the disk cartridge between a mounting and dismounting position where the disk cartridge can be mounted on and dismounted from the holder and an insertion completed position with respect to the holder and a drive mechanism capable of driving the transfer member. For example, the prior art references of Japanese Patent Laid-Open Publication No. HEI 6-267124, Japanese Patent Laid-Open Publication No. HEI 8-102118, Japanese Patent Laid-Open Publication No. HEI 8-171765 and Japanese Patent Laid-Open Publication No. HEI 8-180625 and so on disclose the detailed constructions of such a disk drive.

When inserting the disk cartridge into the holder of the disk drive, there is the possibility that the user might erroneously insert the cartridge backward 180 degrees different from the correct direction or upside down. In this case, the disk cartridge is being inserted with the same width of insertion in the incorrect direction.

In order to prevent the occurrence of such erroneous insertion, it can be considered to provide in a fixed style the holder with a stopper for preventing the insertion of the cartridge when the disk cartridge is being inserted with the same width of insertion in the incorrect direction.

As is well known, the disk cartridge is provided with a groove that has a specified length extending from the end surface on the inserting side in the direction of insertion and is provided on a side portion along the direction of insertion. By providing a projection (stopper) to be slidably fitted in the above groove on, for example, a guide portion of a holder corresponding to the specified side portion along the direction in which the disk cartridge is inserted when the disk cartridge is being inserted in the correct direction, the cartridge is allowed to advance to the fully inserted position when the disk cartridge is being inserted in the correct direction, and the cartridge can be prevented from advancing when the cartridge is being erroneously inserted in the direction that is 180 degrees different from the correct direction.

The above groove is provided on both side portions of the cartridge in the direction in which the cartridge is inserted, and the grooves are positioned not in the center position in the direction of thickness of the cartridge but in an upwardly offset position in the state in which the cartridge is inserted in the correct direction.

That is, if the cartridge is being erroneously inserted backward, then the cartridge is to be inserted with its end surface provided with neither of the above grooves directed forward. Therefore, the stopper provided on the guide portion of the holder interferes with the cartridge end surface and/or the side portion provided with no groove, thereby preventing the cartridge from further advancing.

If the cartridge is being erroneously inserted upside down, then the stopper and the grooves are not aligned with each other in the thickness direction of the cartridge. Therefore, the stopper also interferes with the cartridge end surface and/or the side portion, thereby preventing the cartridge from further advancing.

If the cartridge is being inserted in the correct direction, then the stopper freely slides within the groove of the side portion of the cartridge, so that the cartridge is smoothly inserted without interference with the stopper.

When the cartridge is inserted by a certain stroke from the insertion entrance of the holder in the correct direction by the user's manual operation, a switch for operating a drive mechanism capable of driving the transfer member is turned on, and the further transfer stroke of the cartridge is automatically made by the drive mechanism.

In this case, the shorter the manual insertion stroke of the cartridge is and the longer the automatic transfer stroke of the drive mechanism is, the user is allowed to easily perform the inserting/ejecting operation.

If the erroneous insertion as described above occurs, then it is preferable to prevent the further advancing of the cartridge into the disk drive in the earliest possible stage of insertion of the cartridge (i.e., as close as the insertion entrance of the holder) in terms of preventing the damage to the cartridge and the disk drive by the forced inserting/ejecting operation of the cartridge.

However, the above stopper for preventing the erroneous insertion of the cartridge has conventionally been provided fixed on the holder. Therefore, the stopper cannot help being provided in a relatively deeper portion with respect to the insertion entrance of the holder (for example, a portion located apart from the insertion entrance of the holder by a distance corresponding to the length of the remaining portion of the side portion of the cartridge except for the groove portion) in order to assure the total stroke extending from the mounting and dismounting position to the fully inserted position of the disk cartridge. This means that preventing the cartridge from being inserted in the early stage of insertion of the cartridge (near the insertion entrance of the holder) is impossible.

The cartridge is to be inserted manually by a user to the deep portion where this stopper is provided. Conversely, when ejecting the inserted cartridge, the user is also required to manually eject the cartridge from the deep portion where the stopper is provided. The above has led to the drawback that the automatic transfer stroke achieved by the drive mechanism becomes very short, resulting in a lack of convenience.

SUMMARY OF THE INVENTION

The present invention has been made in view of the aforementioned technical problems and has as an object to provide a disk drive capable of providing an effect when a cartridge is erroneously inserted with the same width of insertion in an incorrect direction (i.e., in a direction 180 degrees different from the correct direction) to prevent the cartridge from further advancing in the earliest possible stage of insertion and secure the longest possible stroke of automatic transfer of the cartridge.

According to a first aspect of the present invention, there is provided a disk drive comprising: a recording and reproducing unit for recording information on a recording and/or reproducing medium encased in a disk cartridge or reproducing the information recorded on the medium; a holder for guiding and holding the disk cartridge that is being inserted; a transfer member (slider) for transferring the disk cartridge between a mounting and dismounting position where the disk cartridge can be mounted on and dismounted from the holder and an insertion completed position where the disk cartridge is completely inserted in the holder while moving together with the disk cartridge; and a drive mechanism which has an electric motor and an output transmission mechanism thereof and is capable of driving the transfer member, the transfer member being provided with a projection that faces a specified side portion of the disk cartridge extending in the direction in which the disk cartridge is inserted and allows the insertion of the cartridge while being slidably fitted in a groove provided on the side portion of the disk cartridge extending in the direction in which the cartridge is inserted when the disk cartridge is being inserted in a correct direction and prevents the further advancing of the disk cartridge when the disk cartridge is being inserted in an incorrect direction with same width of insertion.

By adopting this construction, when the disk cartridge is being inserted with the same width of insertion in an incorrect direction, the disk cartridge can be stopped from further advancing in the mounting and dismounting position of the disk cartridge (i.e., near the insertion entrance of the holder).

In the first aspect of the present invention, the transfer member for transferring the disk cartridge between the mounting and dismounting position and the fully inserted position while moving together with the disk cartridge with respect to the holder is provided with the projection that faces the specified side portion of the disk cartridge extending in the direction in which the cartridge is inserted and allows the insertion of the cartridge while being slidably fitted in the groove extending in the direction in which the cartridge is inserted when the disk cartridge is being inserted in the correct direction and prevents the further advancing of the disk cartridge when the disk cartridge is being inserted in an incorrect direction with the same width of insertion. With this arrangement, when the cartridge is being erroneously inserted with the same width of insertion as in the case of the incorrect direction, the cartridge can be stopped from further advancing in the mounting and dismounting position of the cartridge (i.e., near the insertion entrance of the holder). This arrangement can reduce the possibility of the occurrence to damage of the cartridge and the disk drive due to forced inserting/ejecting operation of the cartridge in the case of erroneous insertion.

In this case, the projection is provided at the transfer member and is movable in the direction in which the cartridge is inserted. Accordingly, there is no limitation on the automatic transfer stroke of the cartridge by the drive mechanism in contrast to the case where a stopper is fixed to the holder. Thus, there is necessitated no new separate component for preventing an erroneous insertion.

According to a second aspect of the present invention, based on the above first aspect of the present invention, the transfer member is provided with a lock member (lock lever) capable of locking the disk cartridge when the disk cartridge is being inserted in the correct direction, and the disk drive is provided with a switch for operating the drive mechanism when the disk cartridge is further inserted by a specified distance in the direction in which the disk cartridge is inserted from the position where the disk cartridge is locked by the lock member.

With this arrangement, by setting the specified distance as short as possible, a long automatic transfer stroke of the cartridge can be secured by the drive mechanism.

In the second aspect of the present invention, basically the same effect as that of the above first aspect of the present invention can be produced. Specifically, the transfer member is provided with the lock member capable of locking the disk cartridge when the disk cartridge is being inserted in the correct direction, and the disk drive is provided with the switch for operating the drive mechanism when the disk cartridge is inserted further by a specified distance in the direction in which the disk cartridge is inserted from the position where the disk cartridge is locked by the lock member. Therefore, the specified distance can be set as short as possible, thereby allowing a long automatic transfer stroke of the cartridge to be secured by the drive mechanism. This arrangement can further improve the convenience in the inserting/ejecting operation.

DETAILED DESCRIPTION OF THE PREFERRED EMBODIMENTS

Preferred embodiments of the present invention will be described in detail below with reference to the accompanying drawings.

Figure 1:
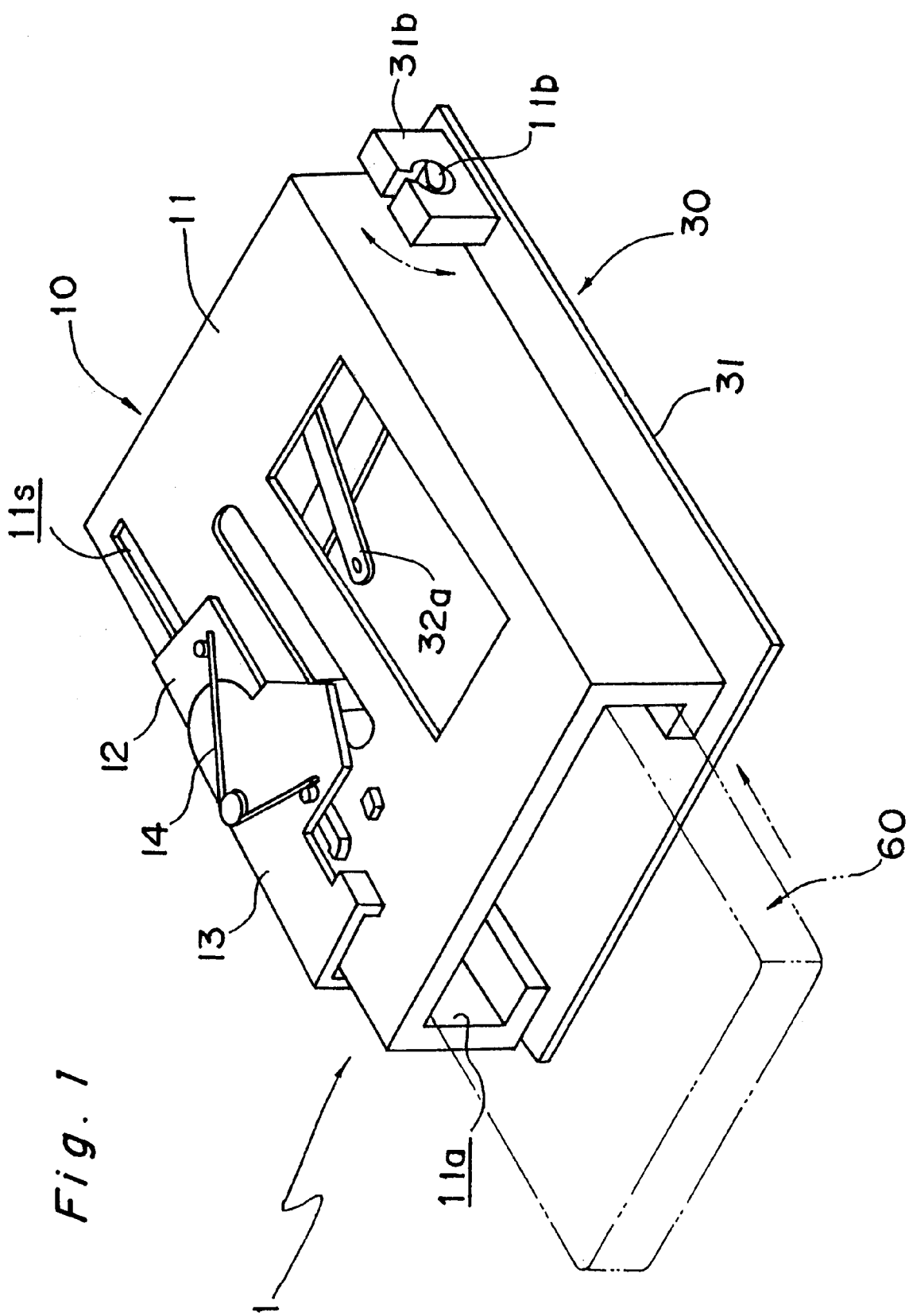
FIG. 1 is an overall perspective view of a disk drive according to an embodiment of the present invention.

FIG. 1 is an overall perspective view of a disk drive 1 according to an embodiment of the present invention. As shown in this figure, the disk drive 1 (occasionally referred to simply as a "unit" hereinafter) is basically constructed of a holder unit 10 provided with a holder 11 for encasing and holding a disk cartridge 60 (occasionally referred to simply as a "cartridge" hereinafter) in which the so-called minidisk (MD) that serves as a recording and/or reproducing medium is encased and a chassis unit 30 provided with a flat-plate-shaped chassis 31 that serves as a mounting base for the principal components of the disk drive 1. The holder unit 10 is supported pivotally in the vertical direction with respect to the chassis unit 30 about a portion near the end portion on the side opposite to the cartridge insertion side, as described later.

The construction of these units 10 and 30 and the operation of the disk drive 1 will be successively described below.

Figure 2:
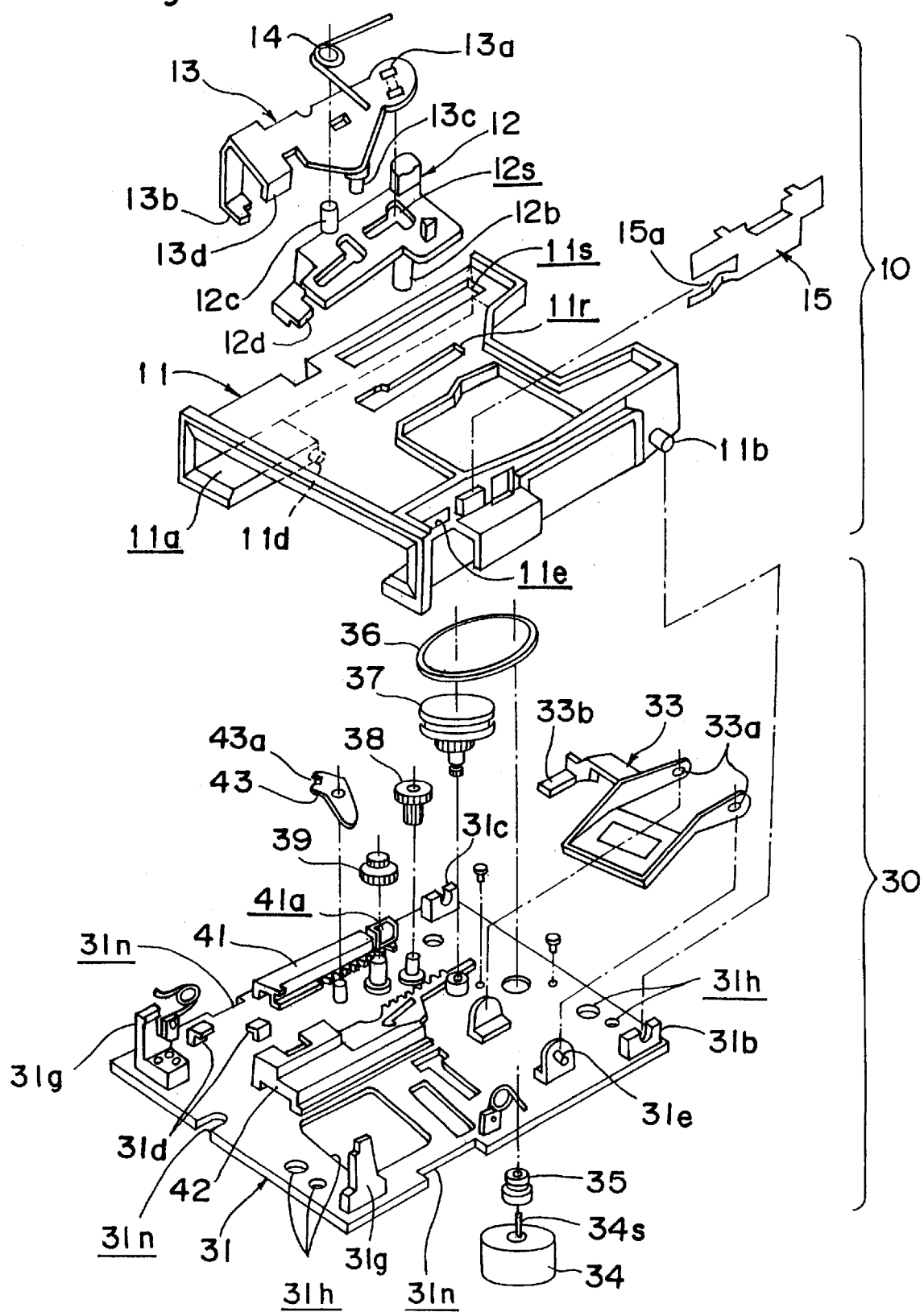
FIG. 2 is an exploded perspective view of a holder unit and a chassis unit of the disk drive shown in FIG. 1.
Figure 3:
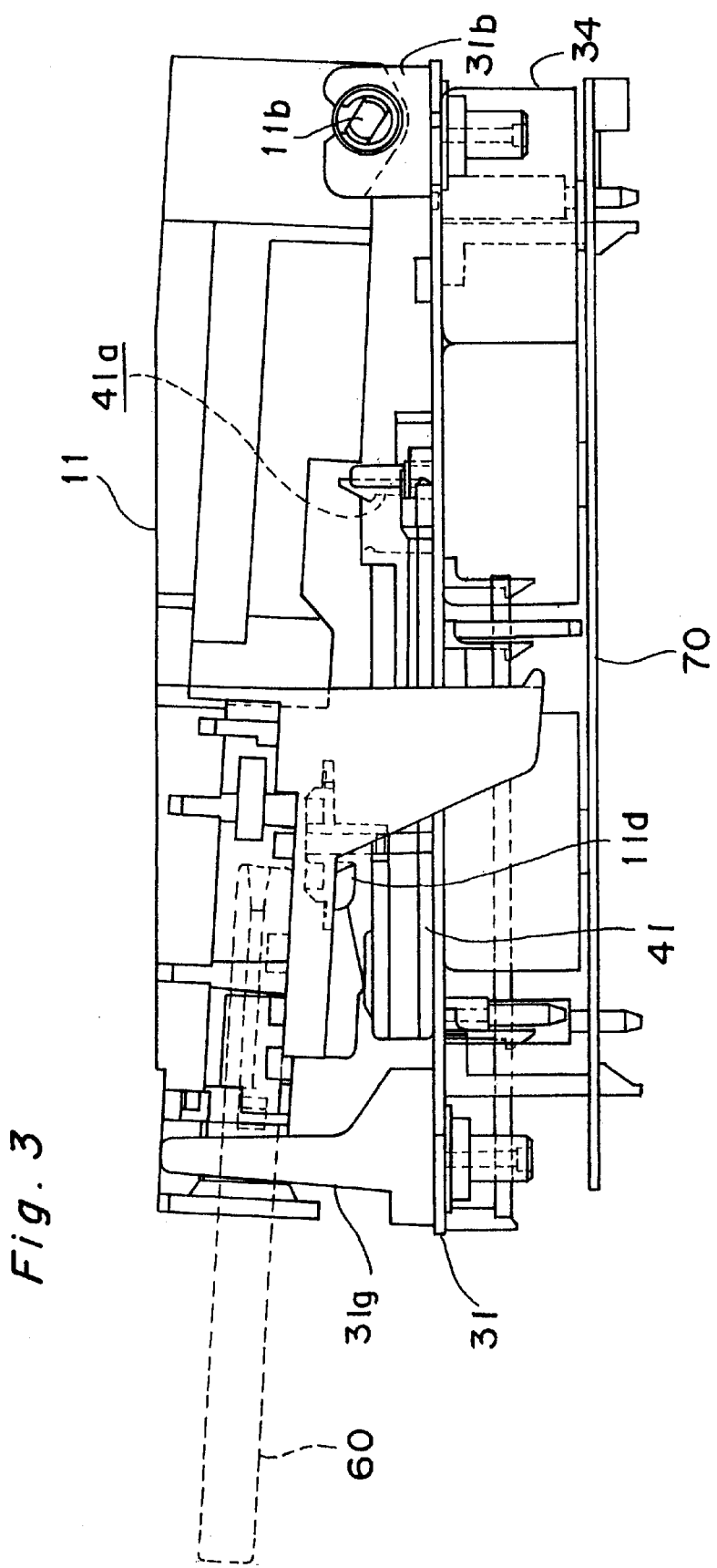
FIG. 3 is an explanatory side view of the disk drive in the assembled state.
Figure 4:
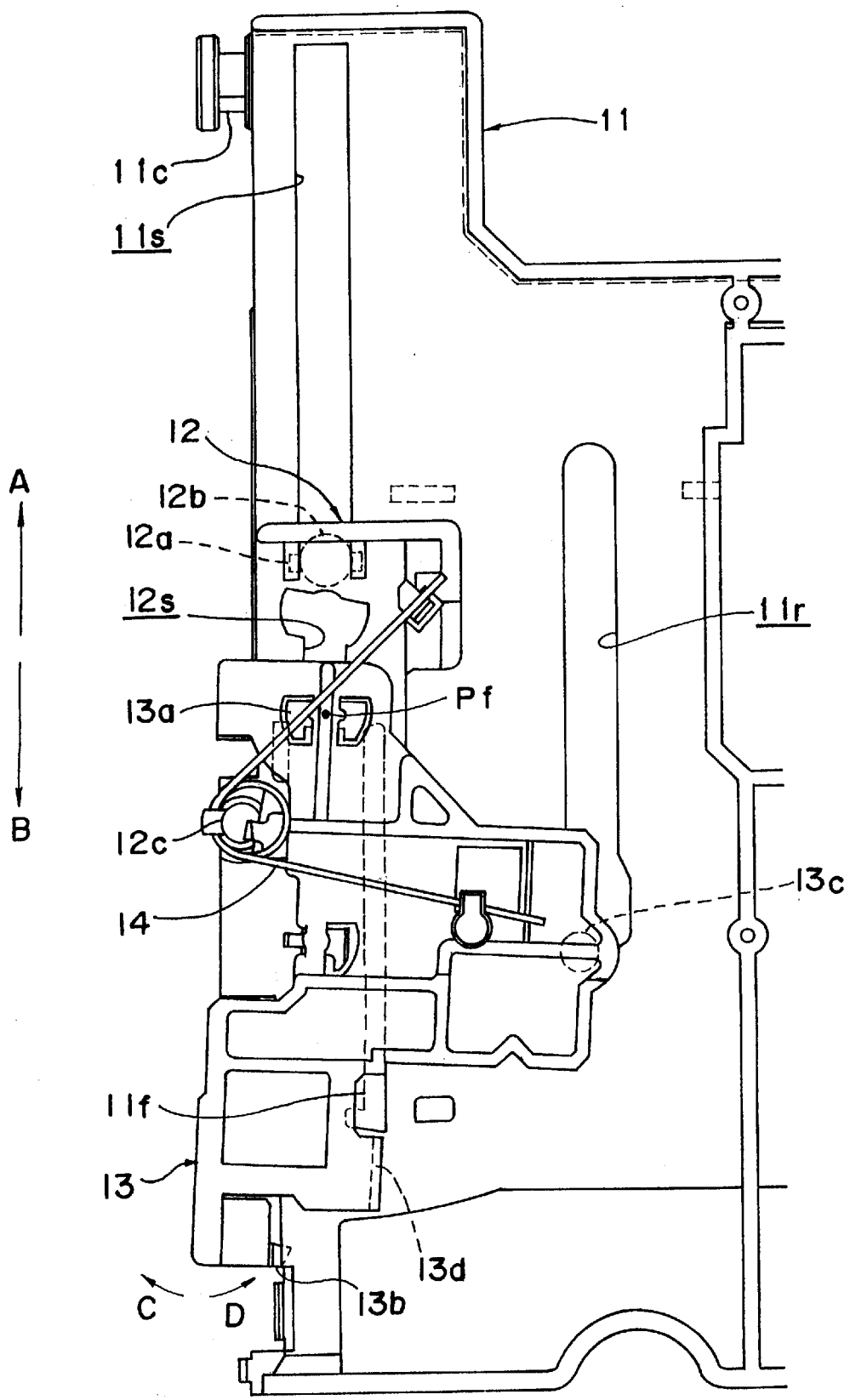
FIG. 4 is an explanatory plan view of the holder unit.
Figure 5:
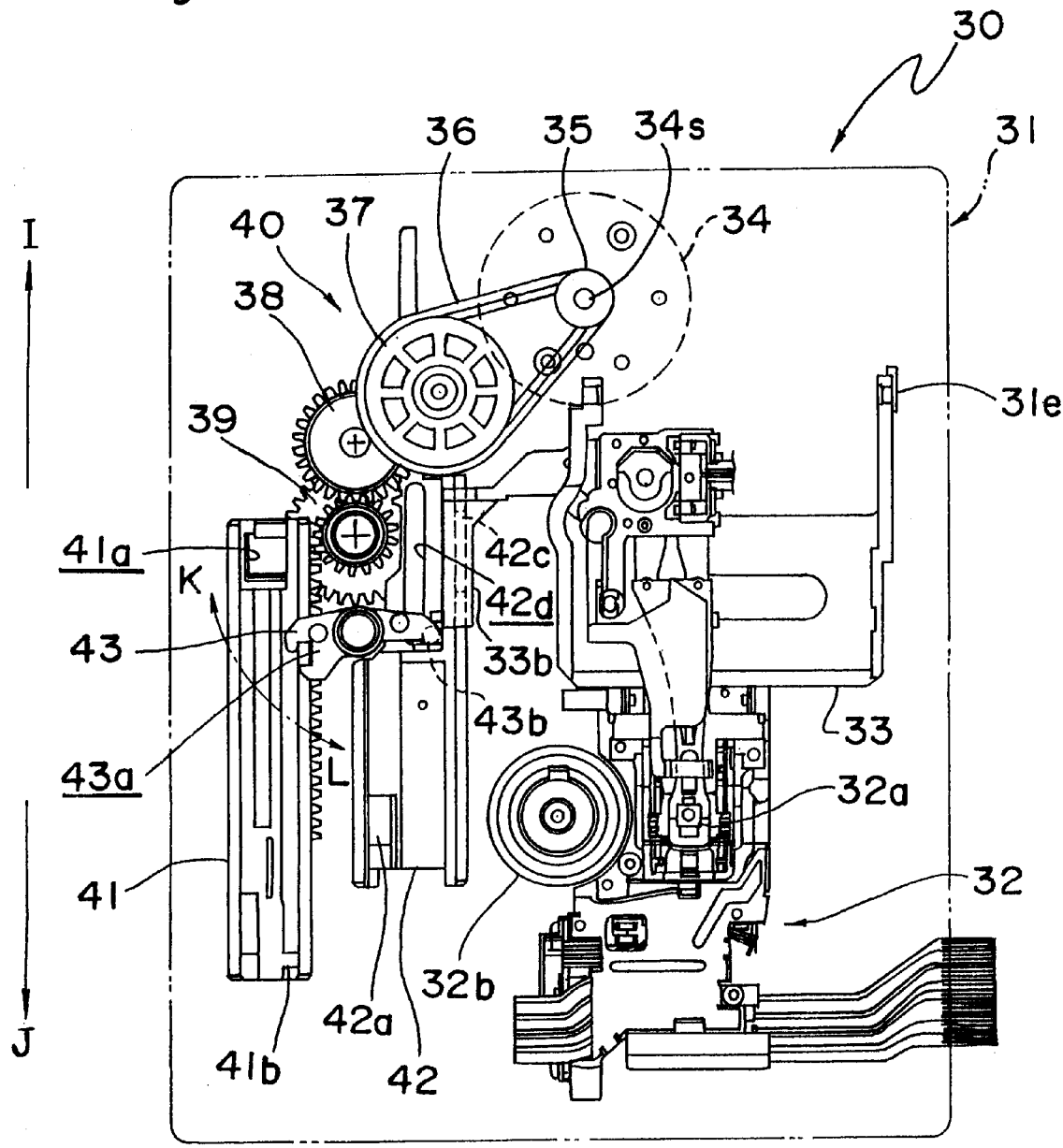
FIG. 5 is an explanatory plan view of the chassis unit.
Figure 6:
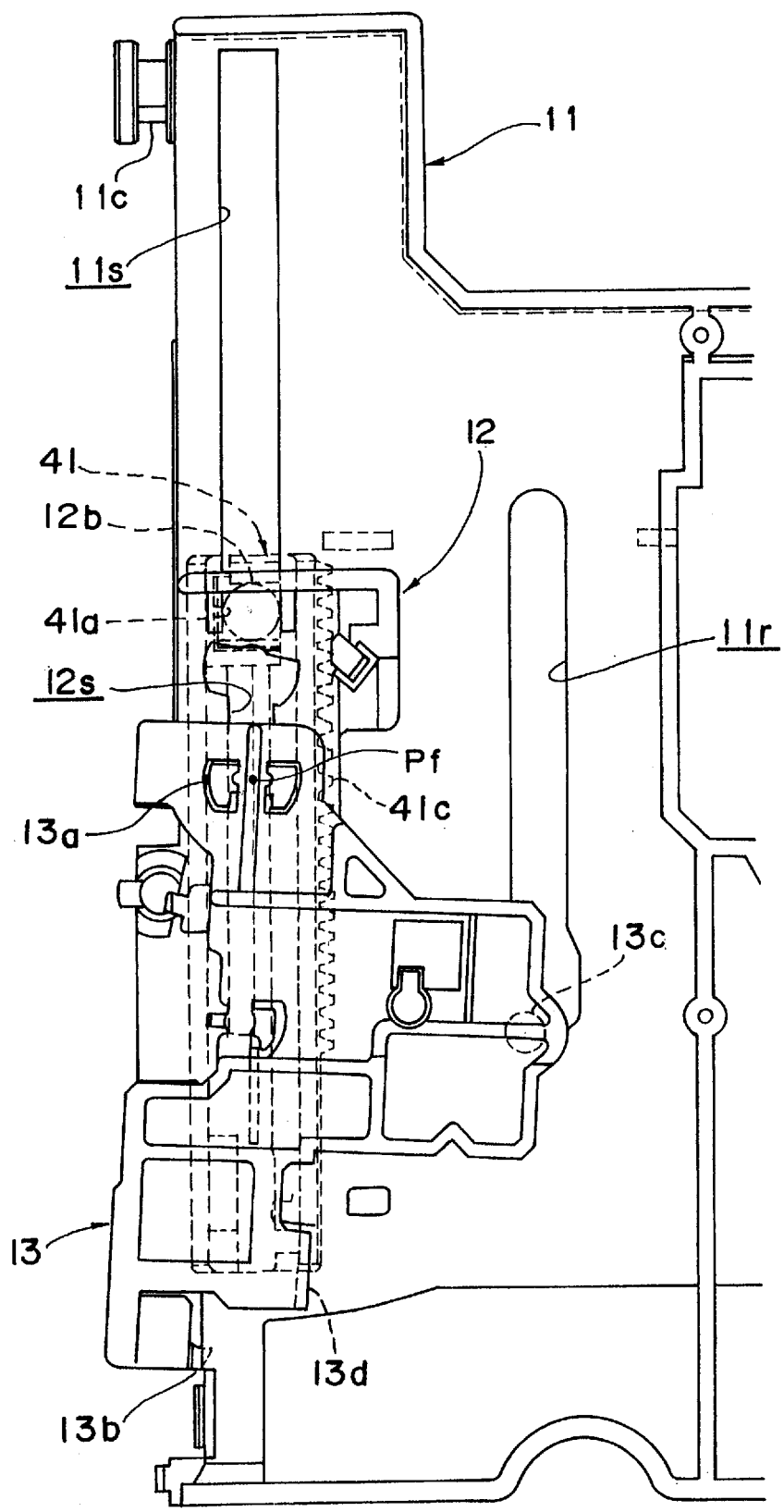
FIG. 6 is an explanatory plan view showing an interlocked state in which a slider of the holder unit is associated with a drive mechanism of the chassis unit.
Figure 7:
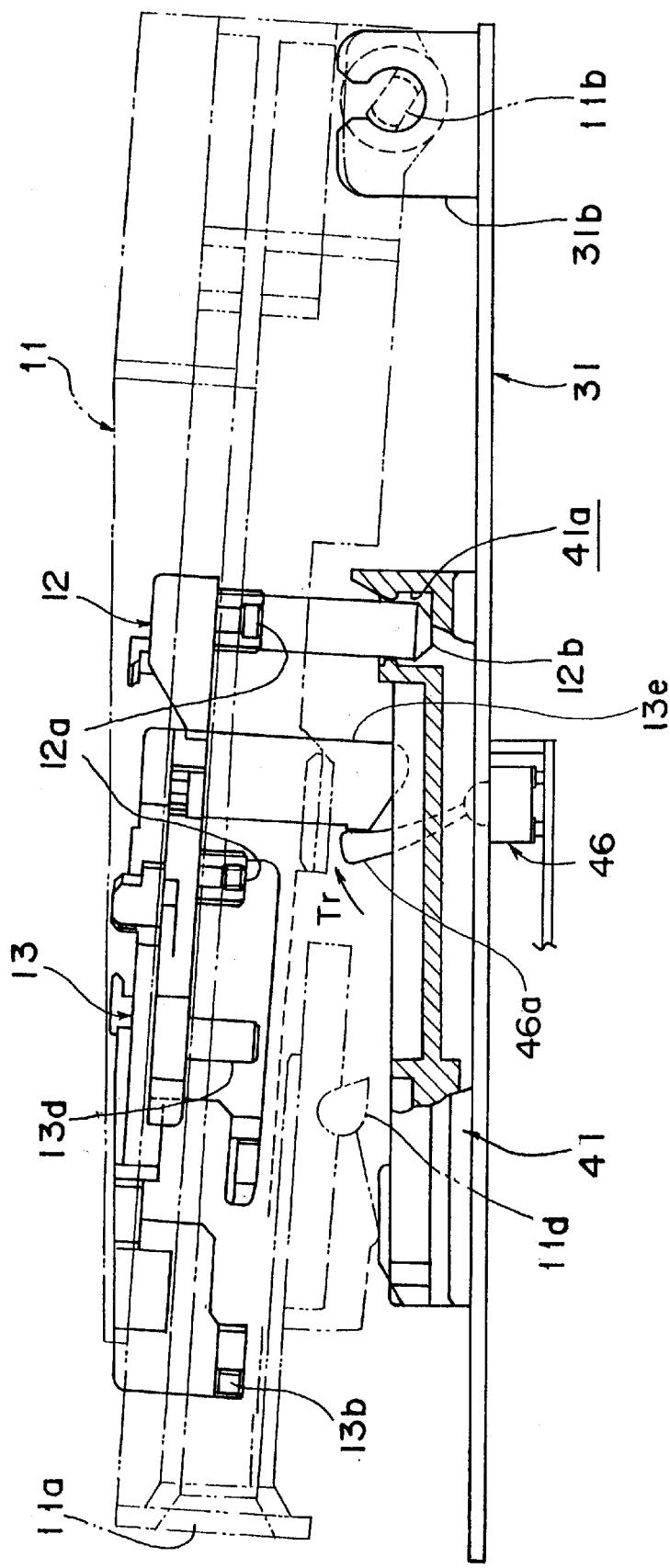
FIG. 7 is an explanatory side view showing an interlocked state in which the slider of the holder unit is associated with the drive mechanism of the chassis unit.

FIG. 2 is an exploded perspective view of the holder unit 10 and the chassis unit 30. FIG. 3 is an explanatory side view of the whole body of the disk drive in the assembled state. FIG. 4 is an explanatory plan view of the holder unit 10. FIG. 5 is an explanatory plan view of the chassis unit 30. FIG. 6 is an explanatory plan view showing an associated state in which a loading mechanism of the holder unit 10 is associated with a drive mechanism of the chassis unit 30. FIG. 7 is an explanatory side view showing the associated state of FIG. 6. It is to be noted that the construction of the disk cartridge 60 is shown in the perspective view of FIG. 24.

The construction of the holder unit 10 will be described first.

This holder unit 10 has the holder 11 that serves as the main body of the holder unit 10 and guides, receives and holds the disk cartridge 60 that t is being inserted, and this holder 11 is basically mounted with a slider 12 that transfers the disk cartridge 60 that is being inserted into the unit 1, a lock lever 13 for locking and unlocking the disk cartridge 60 that is being inserted with respect to the slider 12 and a shutter opener 15 for opening and closing a shutter 61 of the cartridge 60.

It is to be noted that the holder 11 corresponds to the holder stated in the claims of the present application, while the lock lever 13 corresponds to the lock member stated in the claims of the present application.

The holder 11 has one end provided with an opening 11a for receiving the disk cartridge 60 and the other end provided with a pair of pivot pins 11b and 11c (only the pivot pin 11b on one side is shown in FIG. 1 and FIG. 2) that serve as pivots for a pivoting operation in the vertical direction of the holder 11 while projecting laterally outward.

The bottom surface of the holder 11 is provided with an engagement projection 11d to be engaged with a drive mechanism capable of driving a loading mechanism including the slider 12 as described later. It is to be noted that the drive mechanism is provided on the chassis unit 30.

The slider 12 has a hook portion 12a (see FIG. 4) on the lower surface side, and this hook section 12a is slidably engaged with an elongated groove 11s cut in the holder 11. This elongated groove 11s extends in a direction in which the cartridge 60 is inserted or ejected (the direction of arrow A/B shown in FIG. 4), and the hook section 12a (i.e., the slider 12) can move in the above direction (direction A/B) within the range of this elongated groove 11s.

The disk cartridge 60 being inserted from the holder opening 11a is transferred into the unit 1 in accordance with the movement of the slider 12.

The slider 12 is provided with an engagement pin 12b that has a specified length and extends downward, and as described later, the engagement pin 12b comes into engagement with the drive mechanism on the chassis unit 30 side.

It is to be noted that this slider 12 is to transfer the disk cartridge 60 between the mounting and dismounting position where the cartridge can be mounted and dismounted from the holder 11 and a fully inserted position where the cartridge is completely positioned with respect to the holder 11. The slider corresponds to the "transfer member" stated in the claims of the present application and constitutes part of the loading mechanism capable of transferring the cartridge between the above mounting and dismounting position and a recording and reproducing position of the recording and reproducing unit (described later) as disclosed in the claims of the present application.

The lock lever 13 has a hook portion 13a on the lower surface side, and this hook portion 13a is slidably engaged with an elongated groove 12s cut in the slider 12. This elongated groove 12s extends in the insertion/ejection direction (direction A/B, see FIG. 4) of the cartridge 60 in a state in which the slider 12 is assembled with the holder 11. The hook portion 13a (i.e., the lock lever 13) is able to move in the above direction (direction A/B) within the range of this elongated groove 12s and is able to pivot around a center Pf of the hook portion 13a (i.e., in the direction of arrow C/D shown in FIG. 4).

The lock lever 13 is always urged in the direction of arrow C by a spring 14 (lock lever spring) mounted around a pin 12c projecting on the upper surface side of the slider 12. Further, a lock pawl 13b for pulling and retaining the cartridge 60 is provided on the leading end side of the lock lever 13 while being engaged with a side recess 60a provided on one side surface of the disk cartridge 60.

The shutter opener 15 has an engagement hook portion 15a to be engaged with a shutter hole 61a bored in the shutter 61 of the disk cartridge 60 and is mounted and fixed relatively close to the cartridge insertion side end portion of the side portion of the holder 11.

On a side portion of the holder 11 is formed a window 11e relatively close to the cartridge insertion side end portion, and the shutter opener 15 is mounted so that its hook portion 15a projects inwardly of the window 11e.

When the disk cartridge 60 is inserted from the opening 11a into the holder 11, the engagement hook portion 15a of the shutter opener 15 comes into engagement with the shutter hole 61a of the cartridge 60, by which the shutter 61 is opened in accordance with the progress of the inserting operation of the cartridge 60.

The chassis unit 30 will be described next.

This chassis unit 30 is provided with a flat-plate-shaped chassis 31 that serves as the mounting base for the principal components of the disk drive 1. The flat-plate-shaped chassis 31 is mounted with a recording and reproducing unit 32 for recording information on a recording and/or reproducing medium encased in the disk cartridge 60 or reproducing the information recorded on the medium, a head shifter 33 for vertically moving a magnetic head 32a of the recording and reproducing unit 32, a drive mechanism capable of driving the loading mechanism including the slider 12 provided for the holder unit 10 and so on.

As described above, the holder 11 is also supported pivotally around the pivot pins 11b and 11c provided at the end portion oppositely to the opening side in the vertical direction with respect to the flat-plate-shaped chassis 31.

The flat-plate-shaped chassis 31 is obtained by cutting a steel plate material of, for example, a specified thickness into a specified planar shape (rectangular shape in the present embodiment) by a shearing process or the like and punching a plurality of holes 31h and cut portions 31n through specified portions of the plate material. The plate material is neither subjected to a bending process nor an embossing process, and therefore, the planar portion remains flat.

That is, more preferably, the flat-plate-shaped chassis 31 is set to a specified thickness and the base portion except for the hole 31h and the cut portion 31n is formed flat throughout the entire surface. Therefore, as compared with the conventional case of the bending process or the like, the construction itself of the chassis 31 is substantially simplified, and the dimensional (thickness) accuracy and form (flatness) accuracy are also remarkably improved. Therefore, the accuracy of the assembled state of the the principal components of the disk drive 1 can be very easily assured, so that the high-accuracy operation of the disk drive 1 can be guaranteed without specifically necessitating troublesome adjustment or the like. Therefore, the productivity in the assembling work of the disk drive 1 can be remarkably improved, and the assembling performance is also remarkably improved.

At least part of the plurality of holes 31h and/or the cut portions 31n is used for mounting (fixing, supporting or engaging) the constituent elements of the principal components of the disk drive or the other accessory parts on the chassis 31, where the constituent elements or the other accessory parts are mounted on the specified holes 31h and/or the cut portions 31n directly or via a mounting member. Therefore, the constituent elements of the principal components or the other accessory parts are mounted on the chassis in a correctly positioned state without any trouble.

It is to be noted that the remaining holes 31h and/or the cut portions 31n, which are not used for the mounting of the constituent elements of the principal components and/or the other accessory parts' play the role of reducing the weight of the flat-plate-shaped chassis 31 as, for example, through holes 31h and/or cut portions 31n.

More preferably, prior to the mounting of the constituent elements of the principal components of the disk drive and/or the other accessory parts and/or their mounting members, the base portion of the flat chassis 31 except for the holes 31h and the cut portions 31n is subjected to the so-called leveling process. As is well known, this leveling process uses a leveling unit (the so-called leveler) provided with a pair of pressure rollers arranged at specified regular intervals and controls the thickness dimension and flatness of the plate material with extremely high accuracy by leveling the thickness and surface of the plate material by making the plate pass through the space between the pressure rollers. By subjecting the chassis 31 to this leveling process, the thickness dimension and the flatness of the chassis 31 can be stably controlled with higher accuracy.

Further, more preferably, the constituent elements of the principal components and/or the other accessory parts and/or their mounting members are made of synthetic resin and are integrally formed with the chassis 31 by outsert molding subsequently to the leveling process.

This outsert molding is to integrally form the mounting holes 31h and/or cut portions 31n of the chassis 31 with the specified elements by preparing a pair of molds provided with a molding cavity corresponding to the necessary elements (the constituent elements of the principal components and/or the other accessory parts and/or their mounting members), putting the molds close to each other with the chassis 31 interposed between these molds and injecting molten resin into the molding cavity. By this process, the mounting of the constituent elements of the principal components and/or the other accessory parts and/or their mounting members on the chassis 31 can be very efficiently performed with high accuracy without specifically impairing the dimensional accuracy and form accuracy of the chassis 31.

Instead of such an outsert molding, it is acceptable to mount the necessary elements on the corresponding mounting holes 31h and/or the cut portions 31n by screwing or "caulking" or the like.

The leveling process and outsert molding are similar to those that have been conventionally well known, and therefore, neither detailed description nor illustration thereof is provided for the processes.

On the one end side of the flat-plate-shaped chassis 31 are provided bearing portions 31b and 31c for supporting the pivot pins 11b and 11c of the holder 11. The holder 11 can pivot in the vertical direction with respect to the flat-plate-shaped chassis 31 with the pivot pins 11b and 11c supported by the bearing portions 31b and 31c.

The bearing portions 31b and 31c have their upper portions opening upward, so that the pivot pins 11b and 11c of the holder 11 can be very easily (with a one-touch motion) fitted into the bearing portions during assembly.

As an example of the mounting members of the principal components of the disk drive or the constituent elements, the bearing portions 31b and 31c can be enumerated. As an example of the other accessory parts, a pair of plate-shaped engagement members 31g that are provided on one end side of the chassis 31 and extend upward as shown in FIG. 2 can be enumerated. The engagement members 31g are to engage the holder 11 in the assembled state with the chassis 31.

An electric motor 34 for driving the loading mechanism is fixed by a screw member on the lower surface side of the chassis 31 as described later. On the output side of the electric motor 34 is provided an output transmission mechanism 40 (see FIG. 5) for transmitting the rotation of the electric motor 34 while reducing the rotating speed. Below the chassis 31 is arranged a control board 70 (see FIG. 3) on which a control circuit of the disk drive 1 is formed, and the electric motor 34 is electrically connected to this control board 70.

The output transmission mechanism 40 is constructed of a motor pulley 35 to be fixed on an output shaft 34s of the electric motor 34, a power transmission belt 36, a pulley gear 37, an intermediate gear 38, a drive gear 39 and so on. The output of the electric motor 34 is transmitted via the motor pulley 35 and the power transmission belt 36 to the pulley gear 37 and thereafter transmitted to the drive gear 39 via the intermediate gear 38 meshed with a lower gear of the pulley gear 37.

On both sides of the drive gear 39, in terms of the plan view, a pair of rack members (main rack 41 and sub-rack 42) having a toothed portion capable of meshing with the drive gear 39 are arranged opposite to each other, and both the racks 41 and 42 are slidably held and guided on the chassis 31 by a plurality of guide hooks 31d (see FIG. 2). With the rotation of the drive gear 39 as described later, the racks can move in the direction of arrow I/J shown in FIG. 5.

A side cam portion 42a is formed on the upper surface of the side portion on the leading end side of the sub-rack 42, and as described later, this side cam portion 42a comes into engagement with the engagement projection 11d of the holder 11 according to the operation state of the disk drive 1.

An engagement pin 12b provided at the slider 12 on the holder unit 10 side is engaged from above with a recess 41a formed on one end side of the main rack 41.

When assembling the holder unit 10 with the chassis unit 30 in the assembling process of the disk drive 1, more preferably, basically only the engagement pin 12b of the slider 12 is to be engaged with the recess 41a of the main rack 41.

Therefore, by individually sub-assembling the holder unit 10 and the chassis unit 30, thereafter fitting the pivot pins 11b and 11c of the holder 11 into the bearing portions 31b and 31c of the chassis 31 in a state in which the engagement pin 12b is preparatorily positioned so as to be fitted in the recess 41a of the main rack 41 and pivoting the holder 11 downward, the holder unit 10 can be assembled very easily (with a one-touch motion) with the chassis unit 30.

As described above, more preferably, the disk drive 1 is constructed of the two units of the holder unit 10 and the chassis unit 30, and the holder 11 is assembled with the chassis 31 pivotally in the vertical direction in the state in which the engagement pin 12b of the slider 12 and the recess 41a of the main rack 41 are engaged with each other in the vertical direction. Therefore, the final assembling of the disk drive 1 can be achieved by the simple work of supporting the pivot pins 11b and 11c (pivot) of the holder 11 by the bearing portions 31b and 31c (pivot support) of the chassis 31 and pivoting downward the holder 11 while engaging the slider 12 with the main rack 41 of the drive mechanism in the vertical direction. That is, the holder unit 10 can be assembled with the chassis unit 30 only by the pivot operation, and both the units 10 and 30 are engaged with each other by only one portion. Therefore, the assembling work (as well as the disassembling work) of both the units can be very easily achieved.

As a result, the productivity in the assembling work of the disk drive 1 and the serviceability are remarkably improved.

Furthermore, by assembling the holder unit 10 with the chassis 31, the side cam portion 42a (cam surface) of the sub-rack 42 provided on the chassis unit 30 side is engaged in the vertical direction with the engagement projection 11d (cam slider) of the holder 11 provided on the holder unit 10 side, thereby constituting a cam mechanism for vertically moving the disk cartridge 60 between the fully inserted position and the recording and reproducing position of the recording and reproducing unit 32. Therefore, the vertical movement mechanism can be provided with a relatively simple construction, and by descending the disk cartridge 60 by the cam mechanism from the fully inserted position to the recording and reproducing position in addition to the transfer of the disk cartridge from the mounting and dismounting position to the fully inserted completed position by the slider 12, a loading operation sequence can be performed.

In this case, both the cam elements (side cam portion 42a and engagement projection 11d) are coupled with each other in the vertical direction, and therefore, the pivot operation of the holder unit 10 in assembling the holder unit 10 with the chassis 31 is not hindered.

Between both the rack members 41 and 42 is arranged a switch lever 43 capable of coming into engagement with both the members. The switch lever 43 switches over between the main rack 41 and the sub-rack 42 to be used as the counterpart of engagement of the drive gear 39, and the switch lever 43 is pivotally supported in the direction K/L (see the arrow of the one-dot chain line in FIG. 5) on the chassis 31.

If a projection 41b of the main rack 41 comes into engagement with a recess 43a provided at one end of the switch lever 43 to thereby pivot the switch lever 43 in the direction K (see FIG. 5) in accordance with the shift from the state in which the toothed portion of the main rack 41 is engaged with the drive gear 39 in the direction I (see FIG. 5) of the main rack 41, then the sub-rack 42 starts to operate to mesh the toothed portion thereof with the drive gear 39 since a pin 43b provided on the other end side of the switch lever 43 is engaged with a cam groove 42d of the sub-rack 42.

Consequently, if the main rack 41 moves in the direction I, then the sub-rack 42, which has been stopped, is moved in the direction J by the switch lever 43 in the vicinity of the terminal end of the movement.

The head shifter 33 that serves as a support member of the magnetic head 32a of the recording and reproducing unit 32 can arbitrarily pivot in the vertical direction, since a pair of pins 31e of the chassis 31 are inserted in a pair of holes 33a (see FIG. 2) provided on the rear side of the head shifter 33. Then, by this pivot operation, the magnetic head 32a of the recording and reproducing unit 32 are pivoted in the vertical direction. Below a side of this magnetic head 32a is positioned a turntable 32b.

On the side portion of the head shifter 33 is provided an arm 33b which is placed on an upper cam portion 42c of the sub-rack 42, and the arm 33b moves on the upper cam portion 42c while being linked with the operation of the sub-rack 42, by which the arm 33b (i.e., the head shifter 33) pivots in the vertical direction.

Figure 8:
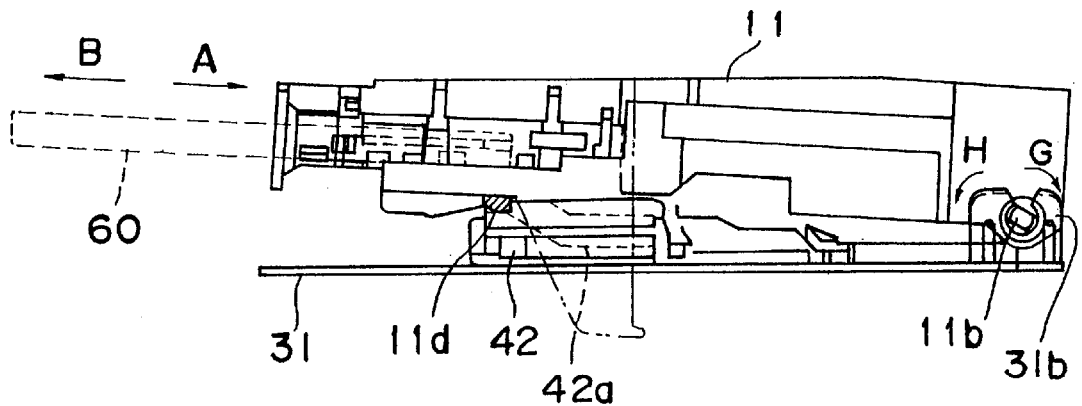
FIG. 8 is an explanatory side view showing an insertion start state when the disk cartridge is being inserted into the holder.
Figure 9:
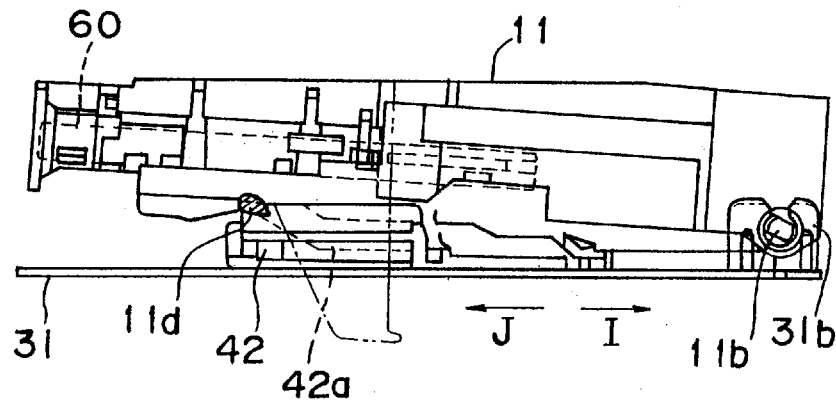
FIG. 9 is an explanatory side view showing a fully inserted state when the disk cartridge is inserted in the holder.
Figure 10:
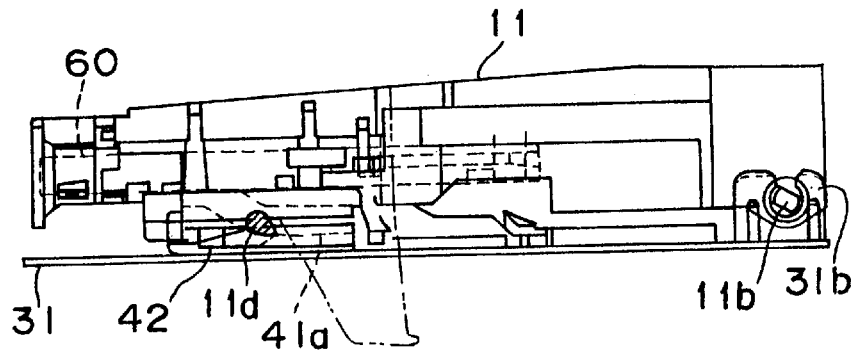
FIG. 10 is an explanatory side view showing a recording and reproducing enabled state when the above disk cartridge is inserted in the holder.

The basic operation in inserting the disk cartridge 60 into the holder 11 will be described next. FIGS. 8 through 10 are explanatory side views of the disk cartridge 60 and the disk drive 1, for explaining a sequence of operation in executing recording and reproducing by inserting the disk cartridge 60 into the holder 11. FIGS. 8, 9 and 10 show an insertion start (mounting and dismounting) position, an insertion completed (closing completed) position and a recording and reproducing position, respectively.

First, if the cartridge 60 is inserted from the mounting and dismounting position (see FIG. 8) into the holder 11, then the cartridge 60 is transferred from the mounting and dismounting position to the or fully inserted position (FIG. 9) by the slider 12.

Then, the sub-rack 42 of the drive mechanism starts to move in the direction J (see FIG. 5). By this operation, the engagement projection 11d of the holder 11 comes into engagement from above with the side cam portion 42a of the sub-rack 42 and moves downward along this side cam portion 42a. This operation pivots the holder 11 in the direction H shown in FIG. 8 and moves the disk cartridge 60 into the recording and reproducing position (see FIG. 10), thereby putting the same into a recording and reproducing state.

That is, the disk cartridge 60 moves from the state of FIG. 8 via the state of FIG. 9 to the state of FIG. 10, and vice versa.

It is to be noted that the slider 12, the lock lever 13, the engagement projection 11d of the holder 11 and the side cam portion 42a of the sub-rack 42 constitute the loading mechanism disclosed in the claims of the present application. That is, the principal portion of the loading mechanism except for the side cam portion 42a is entirely mounted on the holder unit 10.

The electric motor 34, the output transmission mechanism 40, the main rack 41, the sub-rack 42 and the switch lever 43 constitute the drive mechanism disclosed in the claims of the present amplification, and these members are all mounted on the chassis unit 30.

The loading operation of the disk cartridge 60 will be described in more detail below with reference to FIG. 11 through FIG. 13.

If the cartridge 60 is manually inserted into the opening 11a of the holder 11 in the direction A in the mounting and dismounting position (corresponding to the FIG. 8 described above) of the disk cartridge 60 shown in FIG. 11, then by making the end surface of the cartridge 60 abut against a cartridge receiving pin 13c of the lock lever 13 and starting the movement of the receiving pin 13c along the guide groove 11r cut in the holder 11, the lock lever 13 pivots in the direction of arrow D. By this operation, the lock pawl 13b of the lock lever 13 comes into engagement with a side recess 60a of the cartridge 60. In this stage, the further pivoting of the lock lever 13 in the direction D is prevented by the engagement of the lock pawl 13b with the side recess 60a of the cartridge 60.

It is to be noted that the cartridge receiving pin 13c is received in a guide groove 11r cut in the holder 11 while being able to freely slide within the range of this guide groove 11r.

Next, when the cartridge 60 is further pushed in the direction A, a trigger switch 46 (see FIG. 7) for issuing instructions for operating the drive mechanism operates. In the trigger switch 46 shown in FIG. 7, a switch lever 46a, which is urged in the direction of arrow Tr in FIG. 7 is engaged with a projection 13e extending downward from the rear end side of the lock lever 13 in the mounting and dismounting position of the cartridge 60, is inoperable in this state. If the cartridge 60 is pushed in the direction A from this state, then the projection 13e moves rightward in FIG. 7, by which the switch lever 46a becomes free to pivot in the direction of arrow Tr to turn on the trigger switch 46.

This operation drives the electric motor 34, by which the cartridge 60 is further transferred in the direction A via the drive mechanism that uses the electric motor 34 as a drive power source. It is to be noted that the trigger switch 46 is electrically connected to the control board 70.

Figure 13:
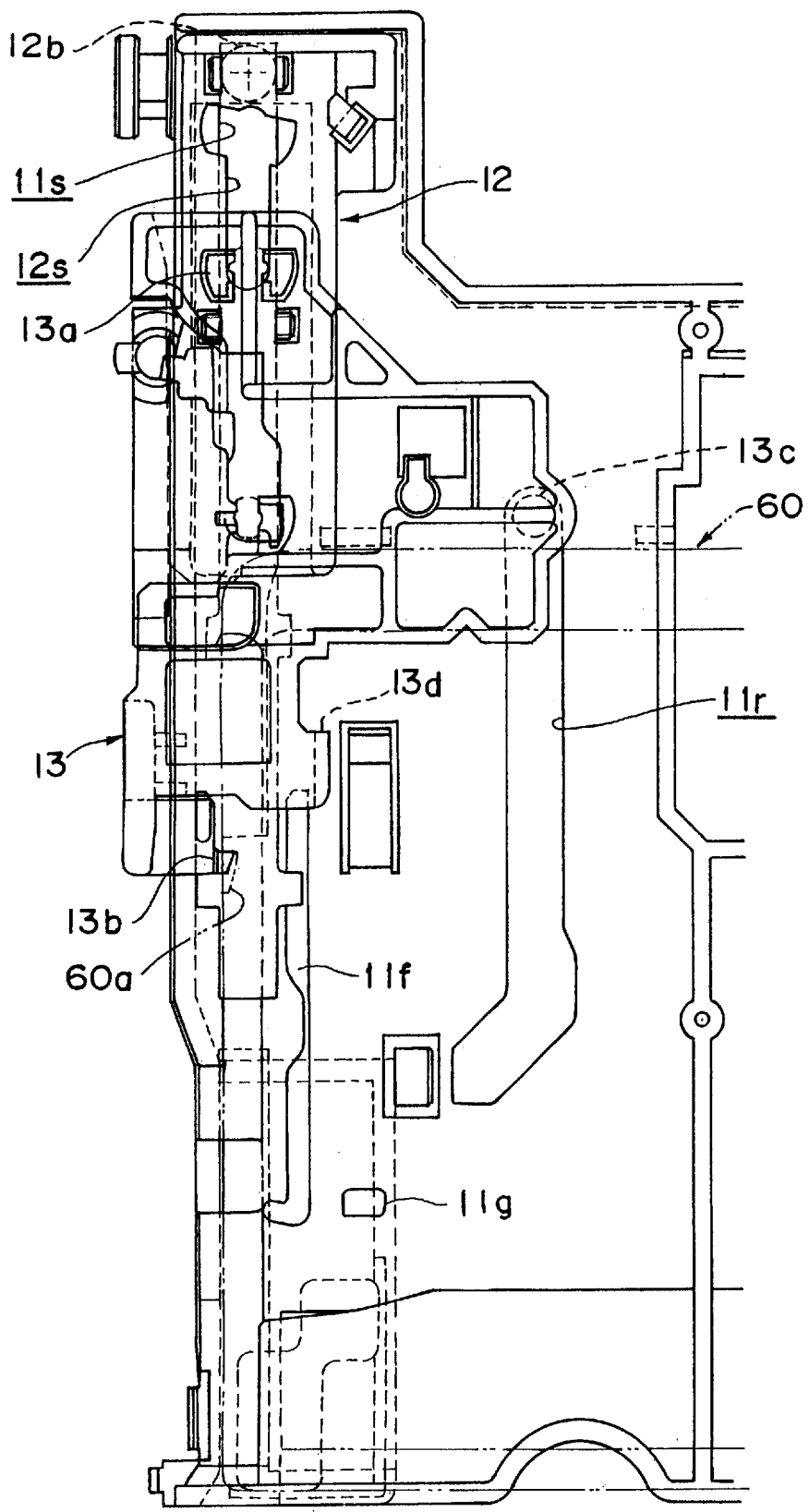
FIG. 13 is an explanatory plan view showing the fully inserted state in which the disk cartridge is inserted in the holder.

FIG. 13 is a plan view showing the closing completed (insertion completed) state of the cartridge 60 (corresponding to the FIG. 9 mentioned above). As is clearly shown in this figure, a rib 11f (regulating rib) extending in the direct ion in which the cartridge is inserted is provided on the upper surface of the holder 11, while a guide pawl 13d is provided on the lock lever 13. This guide pawl 13d is to be engaged with the regulating rib 11f in a state in which the lock pawl 13b is engaged with the side recess 60a of the disk cartridge 60 to lock the cartridge 60.

During movement of the disk cartridge 60 from the mounting and dismounting position to the fully inserted position, the regulating rib 11f of the holder 11 is engaged with the guide pawl 13d of the lock lever 13 to slide the guide pawl 13d along the regulating rib 11f, by which the lock lever 13 is prevented from pivoting in the direction C and the disk cartridge 60 is smoothly and securely transferred in the direction A.

Figure 12:
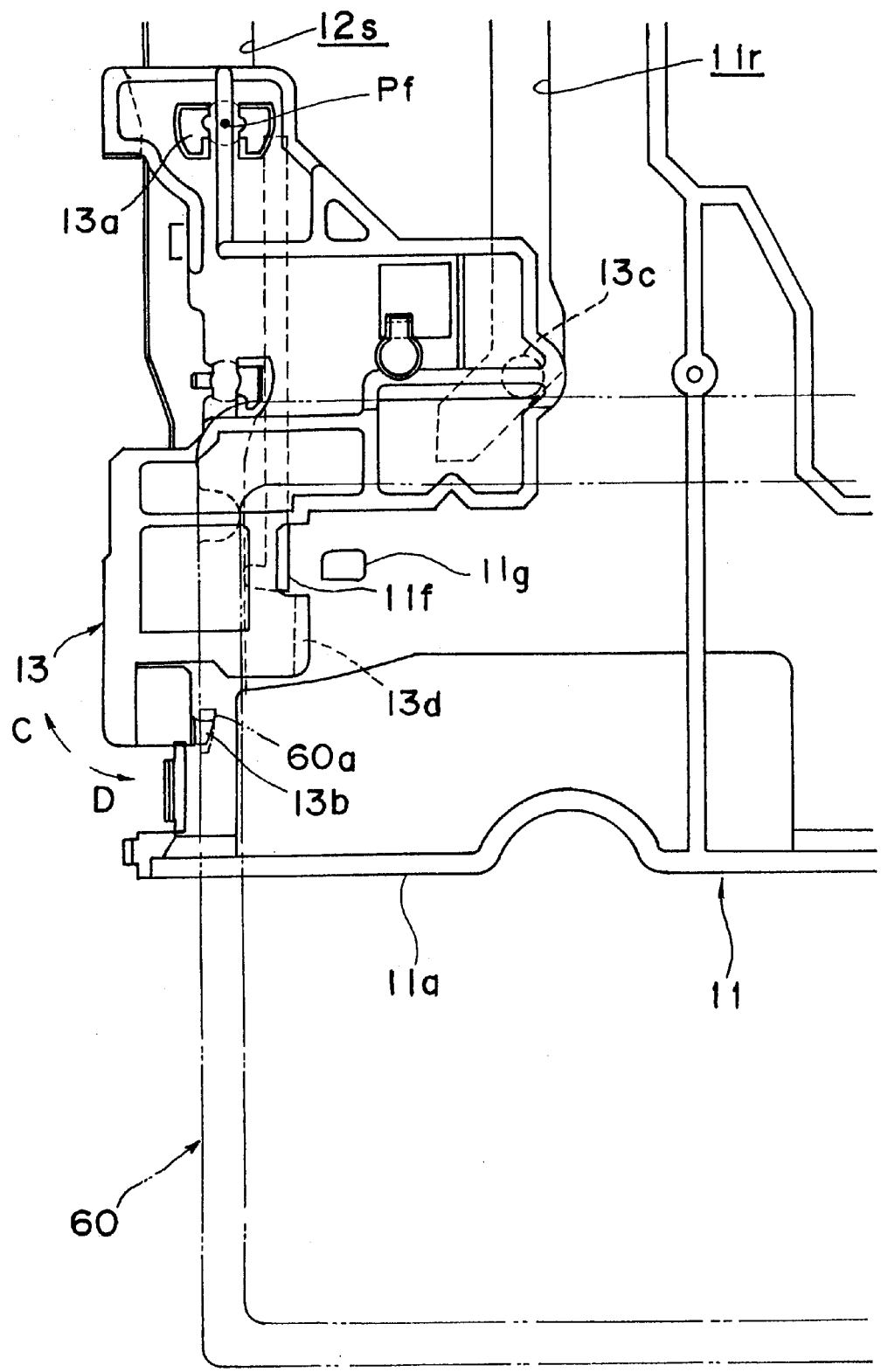
FIG. 12 is an explanatory plan view showing a lock lever engaged state when the disk cartridge is inserted in the holder.
Figure 14:
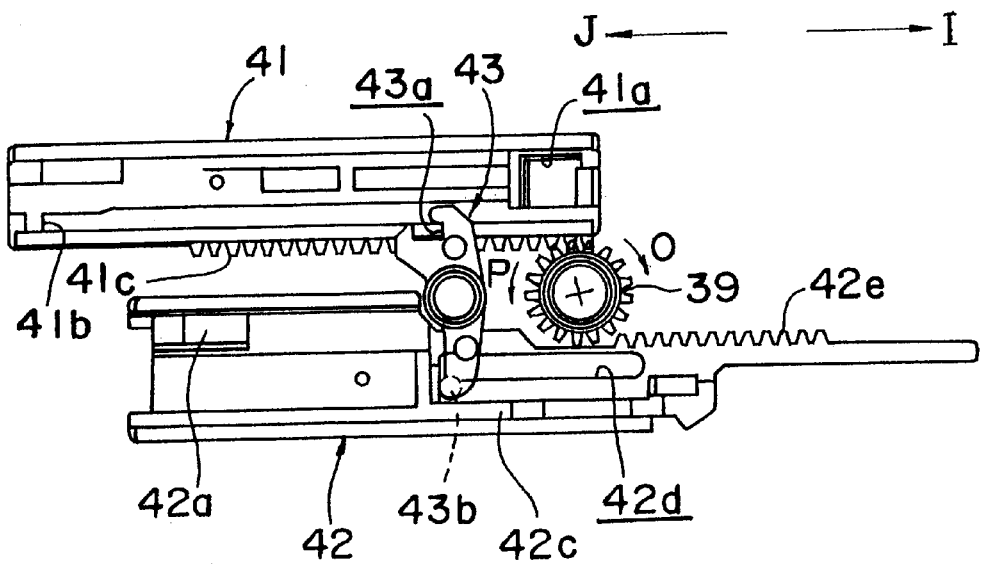
FIG. 14 is an explanatory plan view showing an operation state in which a main rack and a sub-rack operate in a disk cartridge mounting and dismounting position.

When the cartridge 60 is further pushed in the direction A from the state of FIG. 12 described above, the trigger switch (not shown) for issuing the instructions for operating the drive mechanism operates. By this operation, the electric motor 34 starts to rotate, with which the drive gear 39 starts to rotate in the direction of arrow O as shown in FIG. 14 successively via the motor pulley 35, power transmission belt 36, pulley gear 37 and intermediate gear 38, which serve as a speed reducing system constituting the output transmission mechanism 40. Then the drive gear 39 comes into meshing engagement with the toothed portion 41c provided on the main rack 41, thereby moving the main rack 41 in the direction of arrow I.

In this stage, the engagement pin 12b of the slider 12 is engaged with the recess 41a of the main rack 41. Therefore, the lock lever 13 placed on the slider 12 moves, by which the cartridge 60 engaged with the lock pawl 13b of the lock lever 13 moves in the direction A. It is to be noted that the sub-rack 42 is in the stopped state in this stage, when its toothed portion 42e does not mesh with the drive gear 39.

Figure 15:
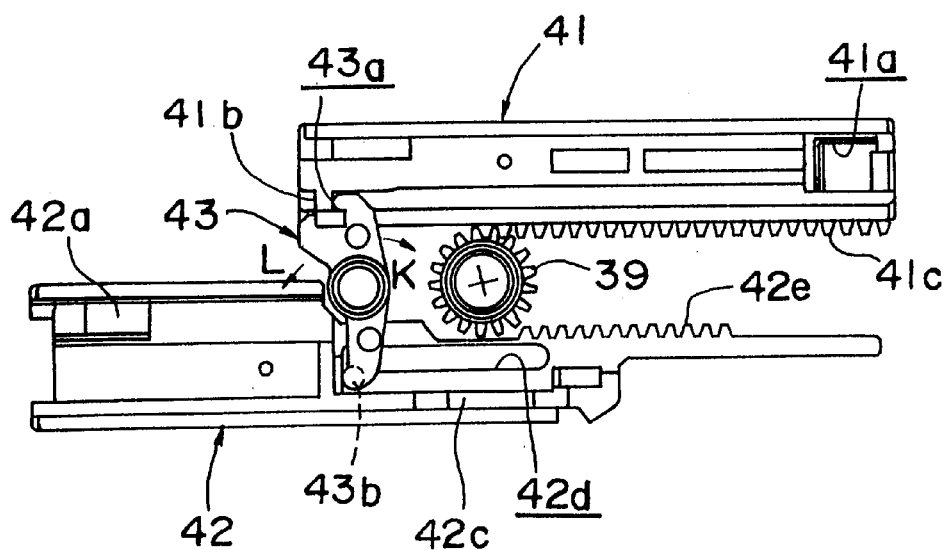
FIG. 15 is an explanatory plan view showing an operation state in which the main rack and the sub-rack operate in a disk cartridge fully inserted position.

The main rack 41 further advances in the direction I from this state, and when the main rack advances to the specified position shown in FIG. 15 (a position corresponding to the fully inserted position of the disk cartridge 60 in the holder 11), the projection 41b of the main rack 41 comes into engagement with the recess 43a of the switch lever 43, thereby pivoting the switch lever 43 in the direction K (see FIG. 15). By this operation, the pin 43b provided at one end of the switch lever 43 pushes the cam groove 42d of the sub-rack 42 in the direction J, by which the sub-rack 42 starts to slide in the same direction (i.e., the direction opposite to the direction in which the main rack 41 slides).

Next, when the main rack 41 further advances in the direction I, the toothed portion 42e of the sub-rack 42 comes into meshing engagement with the drive gear 39, and thereafter, the toothed portion 41c of the main rack 41 is disengaged from the drive gear 39.

Figure 16:
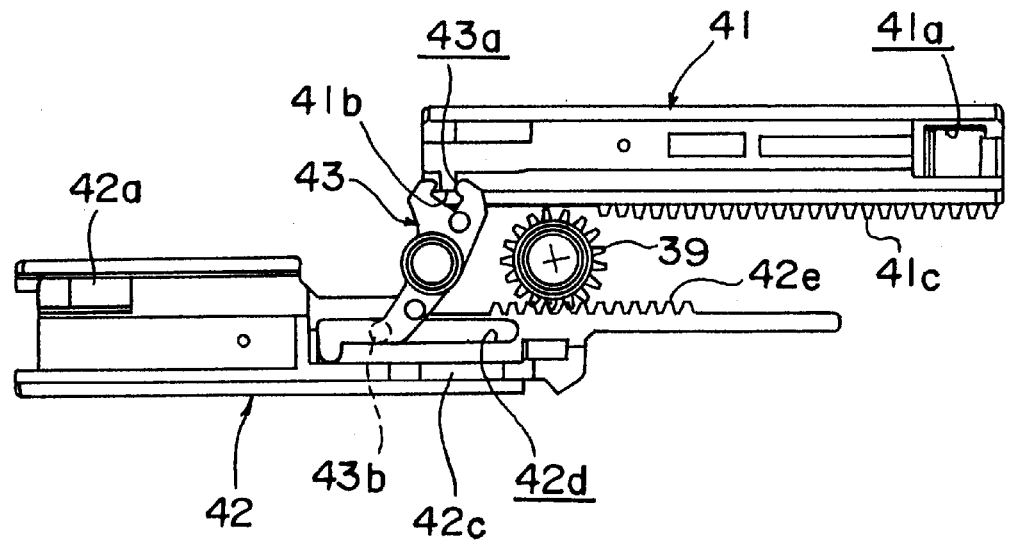
FIG. 16 is an explanatory plan view showing an operation state in which the main rack and the sub-rack operate in a disk cartridge reproducible position.

Then, the sub-rack 42 further moves in the direction J with the rotation of the drive gear 39 and reaches the specified position (position corresponding to the recording and reproducing position of the cartridge 60) shown in FIG. 16.

By this operation, the engagement projection 11d of the holder 11 comes into engagement from above with the side cam portion 42a of the sub-rack 42 and slides along the side cam portion 42a, by which the cartridge 60 is loaded into the recording and reproducing position shown in FIG. 10.

Figure 17:
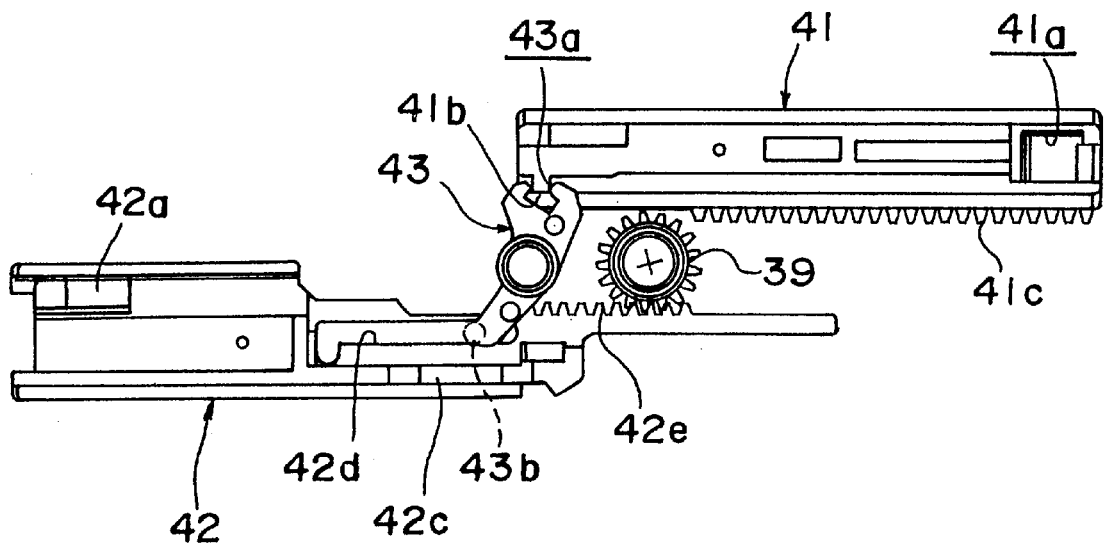
FIG. 17 is an explanatory plan view showing an operation state in which the main rack and the sub-rack operate in a disk cartridge recordable position.

When the sub-rack 42 further advances in the direction J, the head shifter 33 pivots downward since the arm 33b provided on one side surface of the head shifter 33 is engaged from above with an upper surface cam portion 43c of the sub-rack 42 (i.e., positioned on the upper surface cam portion 43c), by which the magnetic head 32a of the recording and reproducing unit 32 is made to pivot downward to be set into the recording enabled state (see FIG. 17).

The disk drive 1 of the present embodiment is provided with a mechanism for preventing the disk cartridge 60 from being inserted when the user tries to incorrectly insert the disk cartridge in a direction different from the correct direction into the disk drive 1 (i.e., into the holder 11).

Figure 24:
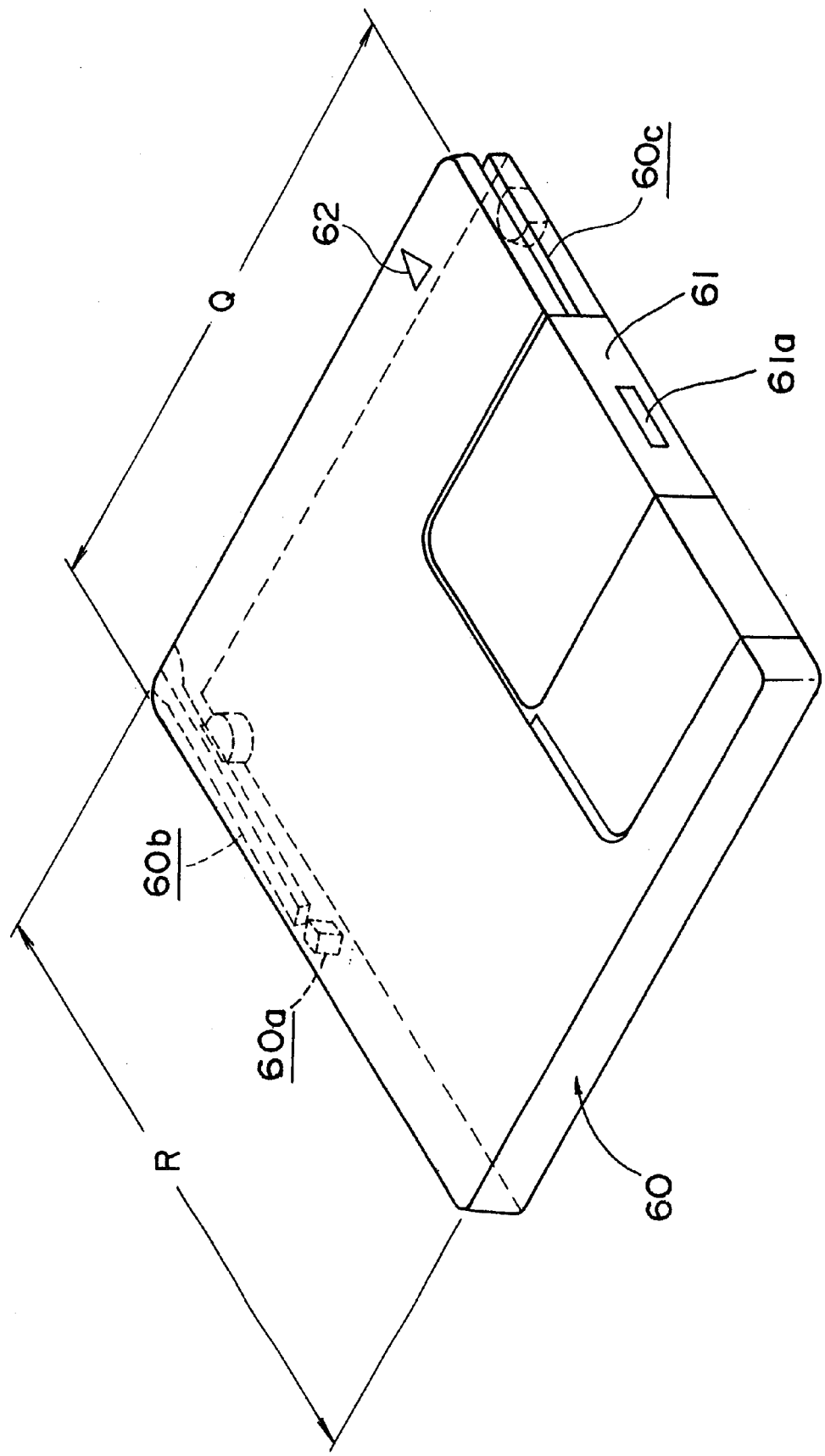
FIG. 24 is an overall perspective view of the disk cartridge.

The mechanism for preventing the incorrect insertion of the disk cartridge 60 will be described next. As shown in FIG. 24, the disk cartridge 60 has a rectangular planar shape constituted by a short side (length R=68 mm) and a long side (length Q=72 mm, Q>R), where the correct direction of insertion of the cartridge extends in the direction of the triangular indication mark 62 with the long side facing the opening 11a of the holder 11 (so that the width of insertion becomes wide).

Grooves 60b and 60c having a specified length from the end surface on the insertion side are provided on both side portions in the direction in which the disk cartridge 60 is inserted, and a side recess 60a for locking use is positioned in the vicinity of the side opposite to the insertion side of the groove 60b provided on one side. The grooves 60b and 60c provided on the side portions of the cartridge are open on the end surface on the insertion side, and the grooves are positioned not in the center position in the direction of thickness of the cartridge 60 but in an upwardly offset position in the state in which the cartridge is inserted in the correct direction.

Figure 18:
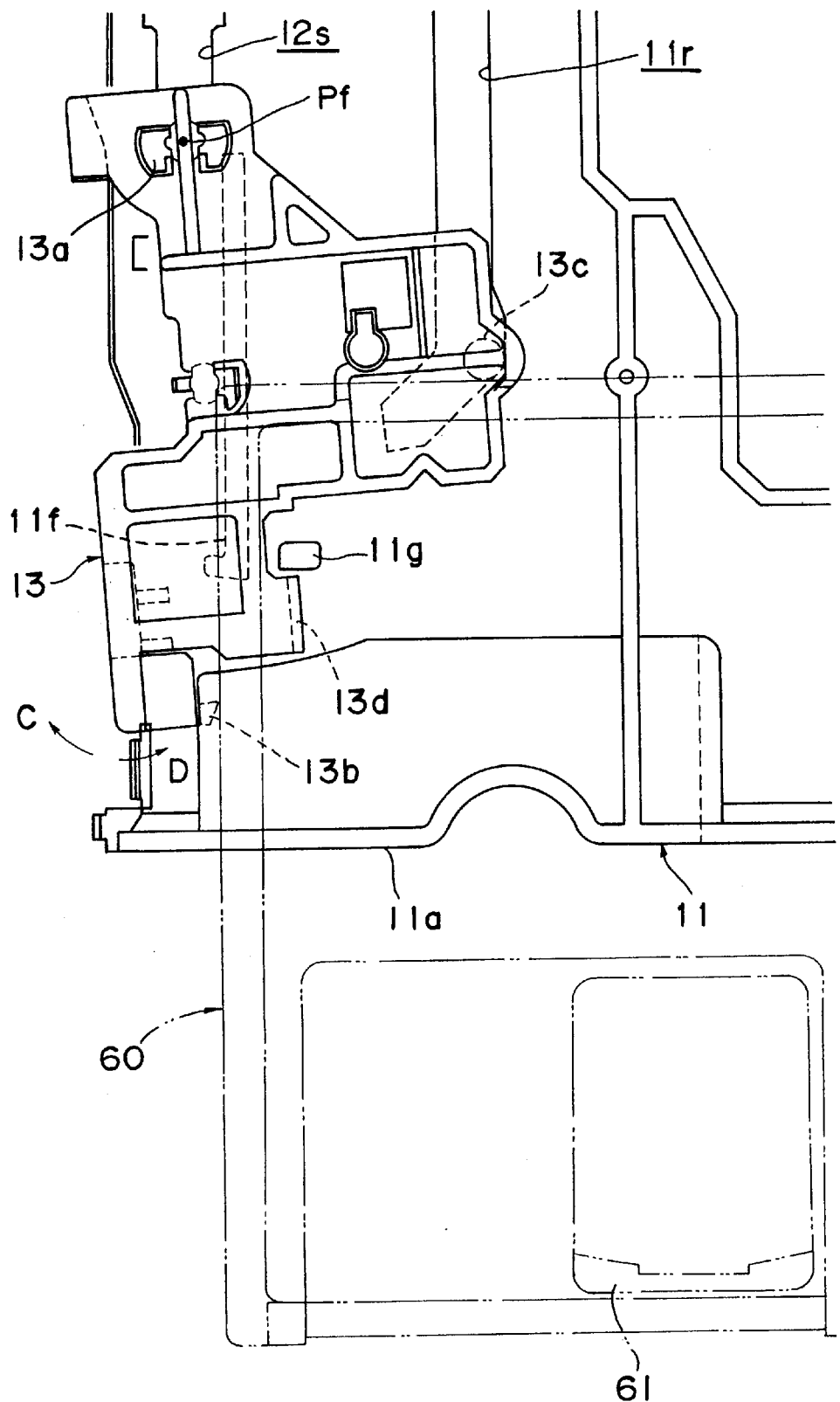
FIG. 18 is an explanatory plan view showing the operating state of a lock lever in the cartridge mounting and dismounting position when the disk cartridge is erroneously inserted in a direction 90 degrees different from the correct direction of the cartridge.
Figure 19:
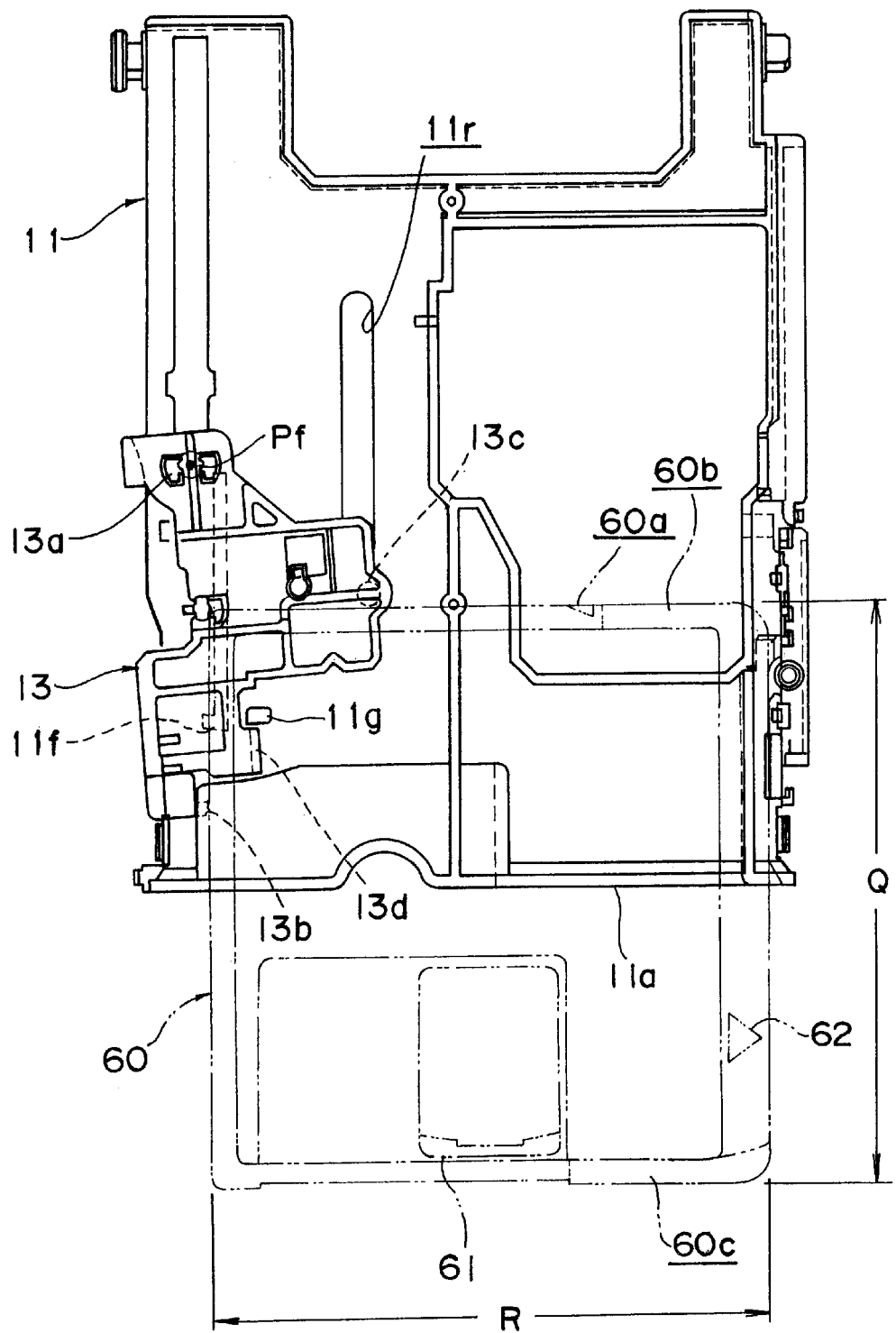
FIG. 19 is an explanatory plan view showing the disk drive and the operating state of a lock lever in the cartridge mounting and dismounting position when the disk cartridge is erroneously inserted in a direction 90 degrees different from the correct direction of the cartridge.

If the disk cartridge 60 is being inserted in a direction 90 degrees different from the correct direction (i.e., the incorrect direction with the narrow width of insertion), then as shown in FIG. 18 and FIG. 19, the end surface on the insertion side of the cartridge 60 abuts against the cartridge receiving pin 13c of the lock lever 13 to start moving the cartridge receiving pin 13c along the guide groove 11r of the holder 11, by which the lock lever 13 is made to pivot in the direction of arrow D.

Figure 11:
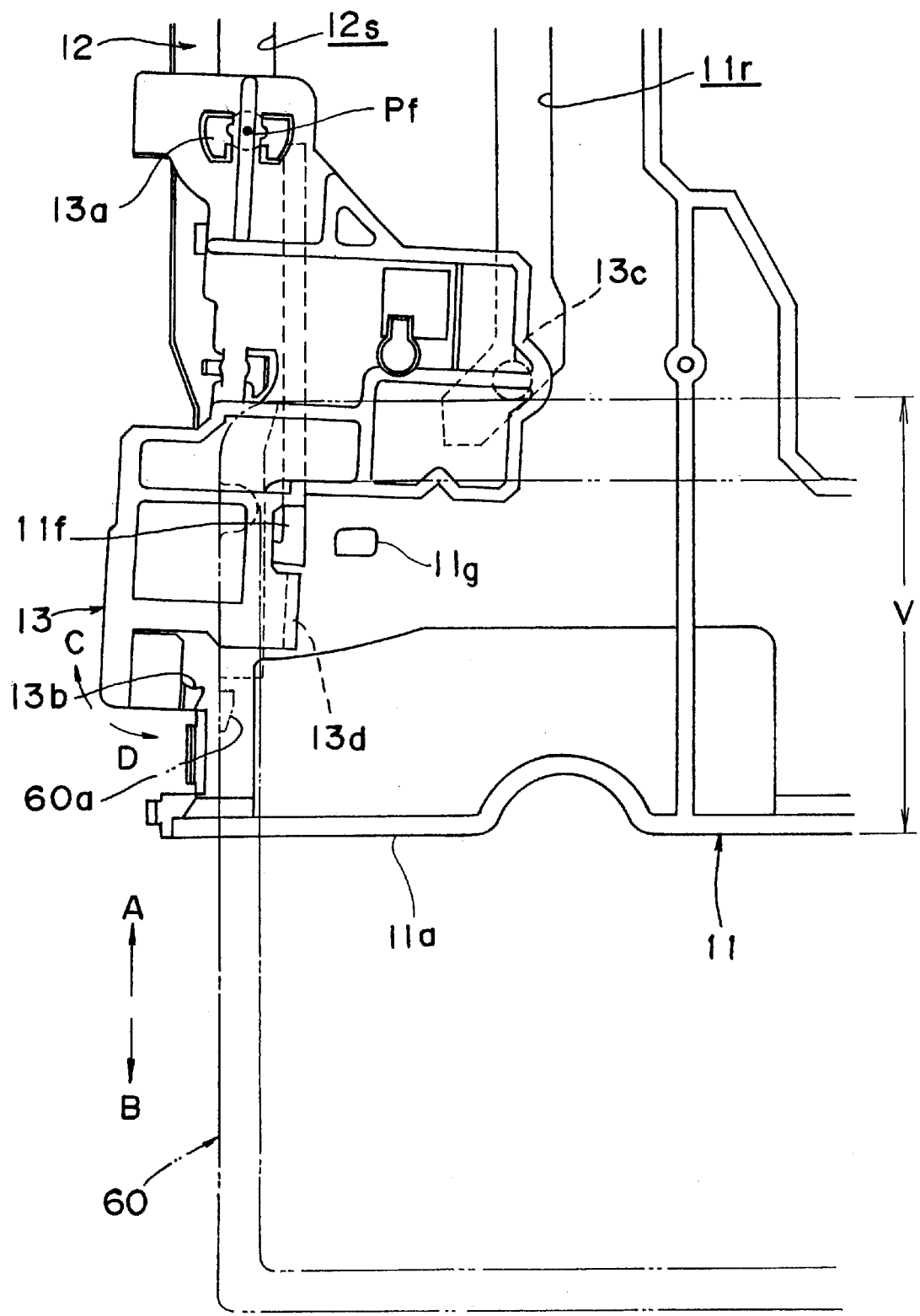
FIG. 11 is an explanatory plan view showing a lock lever disengaged state when the disk cartridge is inserted in the holder.

In this case, the lock lever 13 pivots more largely around the center Pf of the hook portion 13a due to the narrow width of the cartridge 60 as compared with the amount of pivot in the case of insertion in the correct direction (see FIG. 11 through FIG. 13).

On the upper surface of the holder 11 is provided a short rib 11g (stop rib) at a specified interval apart from the side of the regulating rib 11f. If the disk cartridge 60 is being inserted in the incorrect direction with the narrow width of insertion and the lock lever 13 pivots largely, then the guide pawl 13d of the lock lever 13 is engaged with the stop rib 11g provided on the holder 11, by which the lock lever 13 is prevented from further advancing (prevented from moving in the direction A).

This arrangement can reduce the possibility of the occurrence of damage of the disk cartridge 60 and the disk drive 1 due to the forced inserting/ejecting operation of the disk cartridge 60 in the case of an erroneous insertion.

If the disk cartridge 60 is being inserted in the correct direction, as is clearly shown in FIG. 12 and FIG. 13, the guide pawl 13d of the lock lever 13 passes through a space between the regulating rib 11f and the stop rib 11g of the holder 11, thereby allowing the cartridge 60 to be inserted and transferred without any trouble.

That is, taking advantage of the fact that the width of insertion of the cartridge 60 varies depending on when the disk cartridge 60 is being inserted in the correct direction or when the cartridge is being inserted in the incorrect direction 90 degrees different from the correct direction, causing a difference in the amount of pivotal movement of the lock lever 13, it is decided whether the direction of insertion of the cartridge 60 is correct or incorrect, for the prevention of an erroneous insertion. This arrangement provides the measures against the erroneous insertion of the cartridge 60 without additionally incorporating any special component.

An erroneous insertion defined by the backward insertion of the disk cartridge 60 in a direction 180 degrees different from the correct direction (i.e., with same width of insertion) will be described next.

The slider 12 is provided with a projection 12d that faces a specified side portion of the disk cartridge 60 (i.e., the side on which the side recess 60a for locking use is provided) when the disk cartridge 60 is being inserted in the correct direction and is slidably fitted in the groove 60b that is cut in the above side portion and extends in the direction in which the cartridge is inserted.

Figure 20:
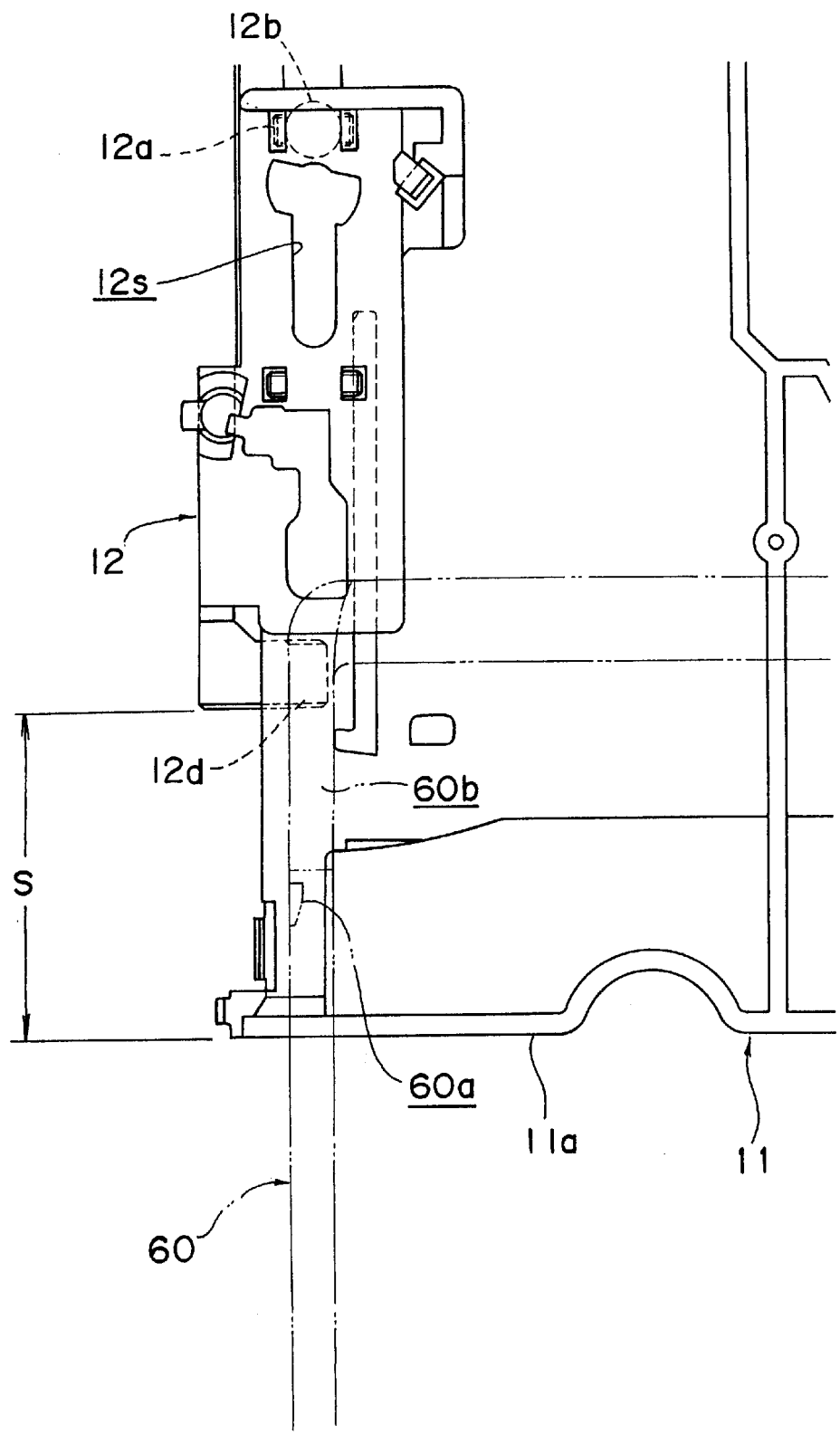
FIG. 20 is an explanatory plan view showing the operating state of a slider in the cartridge mounting and dismounting position when the disk cartridge is being inserted in the correct direction.
Figure 21:
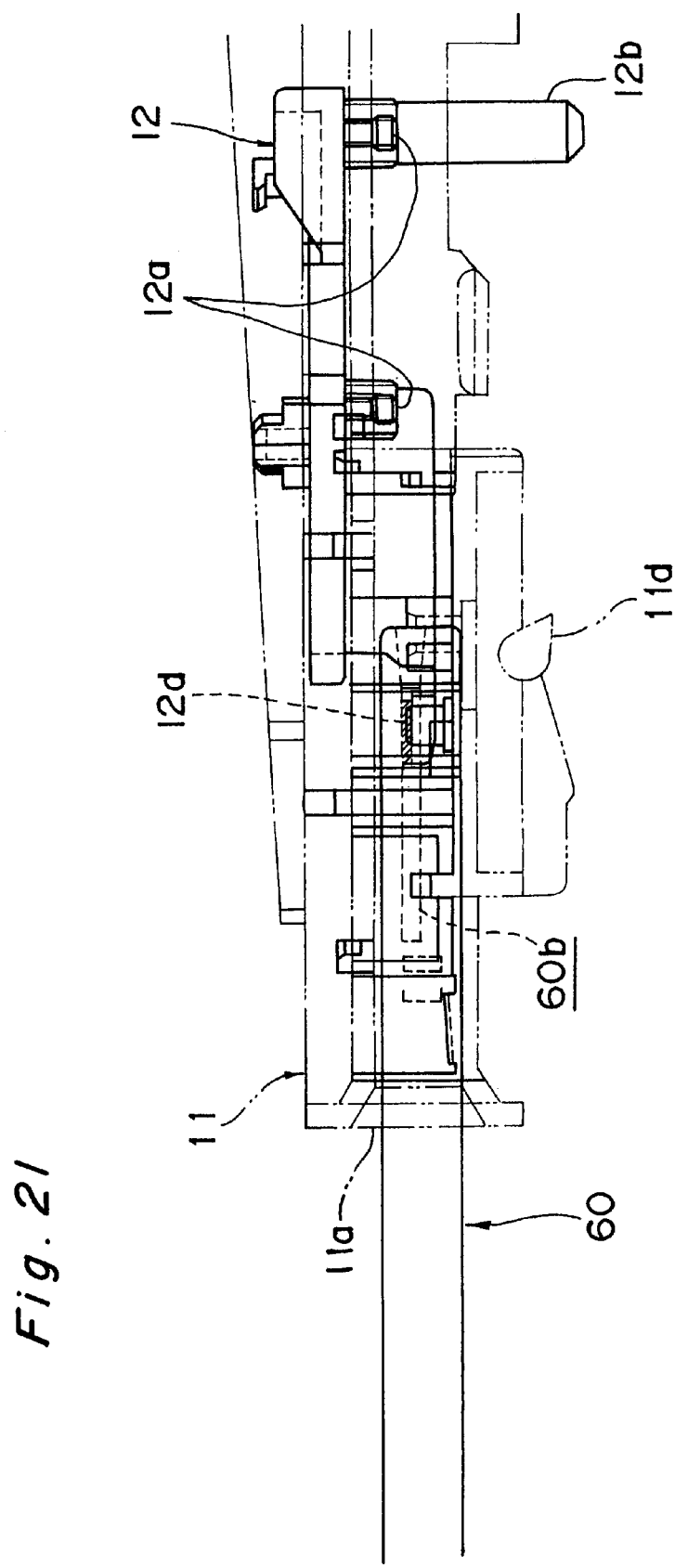
FIG. 21 is an explanatory side view showing the operating state of a slider in the cartridge mounting and dismounting position when the disk cartridge is being inserted in the correct direction.
Figure 22:
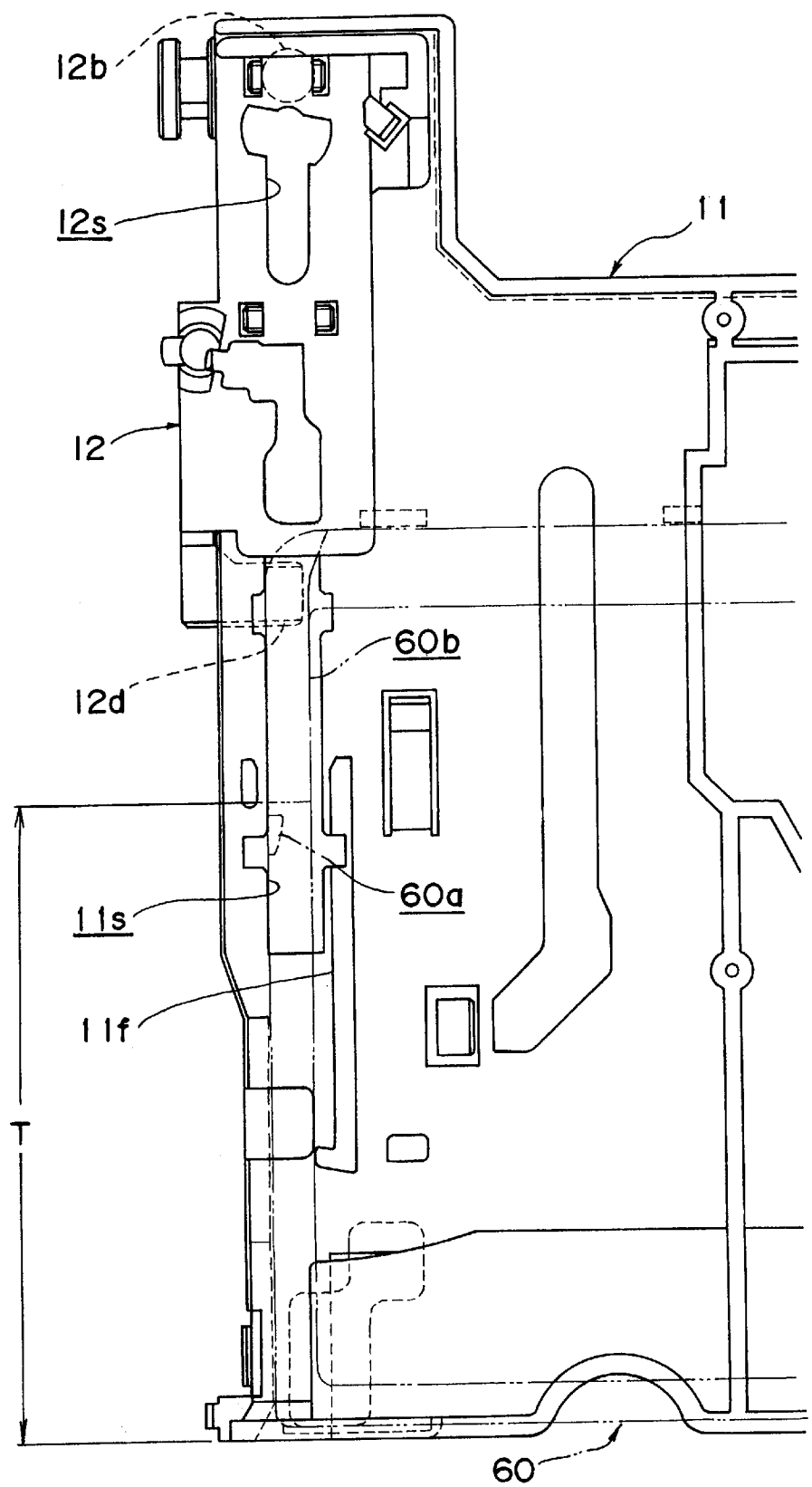
FIG. 22 is an explanatory plan view showing the operating state of a slider in the cartridge fully inserted position when the disk cartridge is being inserted in the correct direction.

If the disk cartridge 60 is being inserted in the correct direction, then as shown in FIG. 20 through FIG. 22, the projection 12d of the slider 12 can freely slide while being fitted in the groove 60b of the cartridge side portion, thereby allowing the disk cartridge 60 to be inserted.

When the disk cartridge 60 is being inserted as described above, the lock pawl 13b of the lock lever 13 comes into engagement with the side recess 60a of the disk cartridge 60, thereby locking the disk cartridge 60 with the slider 12.

If the disk cartridge 60 is further manually moved in the direction of insertion by a very short distance, then the aforementioned trigger switch 46 is turned on to drive the electric motor 34, and the cartridge 60 is automatically transferred by the drive mechanism with regard to the subsequent stroke.

Figure 23:
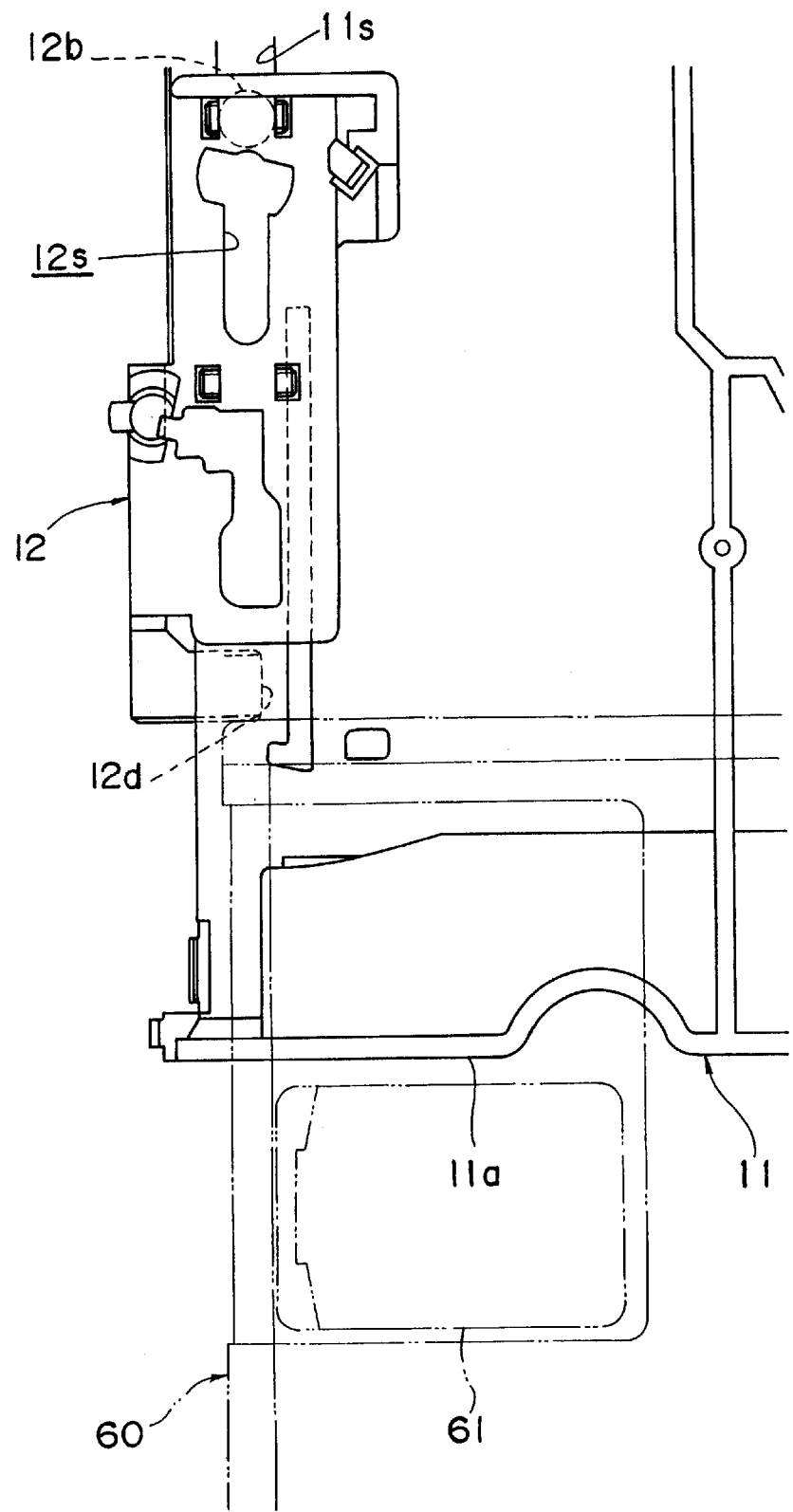
FIG. 23 is an explanatory plan view showing the operating state of a slider in the cartridge mounting and dismounting position when the disk cartridge is erroneously inserted in a direction 180 degrees different from the correct direction of the disk cartridge.

If the disk cartridge 60 is being inserted backward in a direction 180 degrees different from the correct direction (i.e., with same width of insertion), then as shown in FIG. 23, the disk cartridge 60 is to be inserted from the end surface provided with neither one of the grooves 60b and 60c extending in the direction of insertion. Consequently, the projection 12d of the slider 12 interferes with the end surface and/or the side portion of the cartridge 60 in the mounting and dismounting position of the cartridge 60, thereby preventing the disk cartridge 60 from further advancing.

Although not specifically shown, if the disk cartridge 60 is being erroneously inserted upside down, then the cartridge 60 is to be inserted from the end surface provided with the grooves 60b and 60c extending in the direction of insertion. However, these grooves 60b and 60c are not aligned with the projection 12d of the slider 12 in the direction of thickness of the cartridge 60. Therefore, the projection 12d of the slider 12 also interferes with the end surface and/or the side portion of the cartridge 60 in the mounting and dismounting position of the cartridge 60, thereby preventing the disk cartridge 60 from further advancing.

If a projection as described above is fixed on the holder, then the projection must be constructed in a deep portion at a distance greater than the distance T to the groove 60b of the disk cartridge 60 as shown in FIG. 22, when the cartridge 60 is to be inserted into the position T when erroneously inserted.

That is, by providing the projection 12d integrally with the slider 12 and moving the slider 12 from the mounting and dismounting position shown in FIG. 20 to the fully inserted position shown in FIG. 22, the erroneous insertion of the cartridge 60 can be stopped in a position S closer to the opening end of the holder 11 as shown in FIG. 20. Also, since the erroneous insertion is stopped in the position S, the cartridge receiving pin 13c of the lock lever 13 shown in FIG. 11 can be moved to a position V near the opening end of the holder 11, thereby allowing the loading stroke of the cartridge 60 to be increased.

As described above, according to the present embodiment, the slider 12 that transfers the disk cartridge 60 between the mounting and dismounting position and the insertion completed position while moving together with the cartridge 60 is provided with the projection 12d. With this arrangement, if the cartridge 60 is being erroneously inserted with the same width of insertion as in the case of the correct direction, then the cartridge 60 can be stopped from further advancing in the mounting and dismounting position of the cartridge 60 (i.e., near the insertion entrance 11a of the holder 11). This arrangement can reduce the possibility of the occurrence to damage of the cartridge 60 and the disk drive 1 due to the forced inserting/ejecting operation of the cartridge 60 in the case of erroneous insertion.

In this case, the projection 12d is provided on the slider 12 and is movable in the direction in which the cartridge is inserted. Accordingly, there is no limitation on the automatic transfer stroke of the disk cartridge 60 by the drive mechanism in contrast to the case where a stopper fixed to the holder is provided.

Furthermore, the lock lever 13 capable of locking the disk cartridge 60 when the disk cartridge 60 is being inserted in the correct direction is provided at the slider 12, and the trigger switch 46 for operating the drive mechanism when the disk cartridge 60 is inserted further by a specified distance in the direction in which the disk cartridge is inserted from the position where the disk cartridge is locked by the lock lever 13. Therefore, by setting the specified distance as short as possible, a long automatic transfer stroke of the cartridge 60 can be secured by the drive mechanism. This arrangement further improves the convenience in the inserting/ejecting operation.

It is to be noted that the present invention is not limited to the above embodiment, and various improvements or modifications in design can, of course, be achieved within the scope thereof, not departing from the essence thereof.

What is claimed is:

1. A disk drive comprising:
    a recording and reproducing unit for recording information on a recording and/or reproducing medium encased in a disk cartridge or reproducing the information recorded on the medium;
    a holder for guiding and holding the disk cartridge upon insertion thereof;
    a slider for transferring the disk cartridge between a mounting and dismounting position, where the disk cartridge can be mounted on and dismounted from said holder, and an insertion completed position, where the disk cartridge is completely inserted in the holder; and
    a drive mechanism capable of driving said slider,
        wherein said slider slides in the same direction as the disk cartridge in an inserting/ejecting operation when the disk cartridge is in a correct orientation for insertion in said holder,
        wherein said slider is provided with a projection that faces a specified side portion of the disk cartridge extending in the direction in which the disk cartridge is inserted and said projection allows insertion of the cartridge while being slidably fitted in a groove provided on the specified side portion of the disk cartridge extending in the direction in which the cartridge is inserted when the disk cartridge is being inserted in the correct orientation, and prevents the disk cartridge from further advancing when the disk cartridge is being inserted in an incorrect orientation although with the correct width of insertion.

2. A disk drive as claimed in claim 1, wherein said slider is provided with a lock member that is capable of locking the disk cartridge when the disk cartridge is being inserted in the correct orientation, and said disk drive is provided with a switch for operating said drive mechanism when the disk cartridge is further inserted by a specified distance in the direction in which the disk cartridge is inserted from the position where the disk cartridge is locked by said lock member.

3. A disk drive as claimed in claim 2, wherein said lock member is pivotally supported by said slider, and said lock member is capable of engaging and locking the disk cartridge which has a short side and a long side,
    wherein said lock member pivots upon engagement with the disk cartridge as the disk cartridge is inserted such that said lock member is pivoted through a first pivot amount when the disk cartridge is inserted in a correct position with the long side being the leading side, and said lock member is pivoted through a second pivot amount when the disk cartridge is inserted in an incorrect position with the short side being the leading side.

4. A disk drive as claimed in claim 3, wherein said holder is provided with a stopper for allowing said lock member to move in the insertion direction of the disk cartridge in a state in which said lock member has been pivoted by the first pivot amount, and for preventing said lock member from moving in the insertion direction of the disk cartridge in a state in which said lock member has been pivoted by the second pivot amount.

5. A disk drive as claimed in claim 1, further comprising a lock member pivotally supported by said slider, said lock member being capable of engaging and locking the disk cartridge, the disk cartridge having a short side and a long side,
    wherein said lock member pivots upon engagement with the disk cartridge as the disk cartridge is inserted such that said lock member pivots by a first pivot amount when the disk cartridge is inserted in a correct position with the long side being the leading side, and said lock member pivots by a second pivot amount when the disk cartridge is inserted in an incorrect position with the short side being the leading side.

6. A disk drive as claimed in claim 5, wherein said holder is provided with a stopper for allowing said lock member to move in the insertion direction of the disk cartridge in a state in which said lock member has been pivoted by the first pivot amount, and for preventing said lock member from moving in the insertion direction of the disk cartridge in a state in which said lock member has been pivoted by the second pivot amount.

* * * * *